(12) United States Patent
Hintzer et al.

(10) Patent No.: US 7,795,332 B2
(45) Date of Patent: Sep. 14, 2010

(54) METHOD OF REMOVING FLUORINATED CARBOXYLIC ACID FROM AQUEOUS LIQUID

(75) Inventors: Klaus Hintzer, Kastl (DE); Michael Jürgens, Neuoetting (DE); Harald Kaspar, Burgkirchen (DE); Herbert Koenigsmann, Burgkirchen (DE); Kai Helmut Löchhaas, Neuoetting (DE); Andreas R. Maurer, Langenneufnach (DE); Werner Schwertfeger, Altoetting (DE); Tilman Zipplies, Burghausen (DE); George G. I. Moore, Afton, MN (US); Jay F. Schulz, Inver Grove Heights, MN (US); Richard M. Flynn, Mahtomedi, MN (US)

(73) Assignee: 3M Innovative Properties Company, St. Paul, MN (US)

(*) Notice: Subject to any disclaimer, the term of this patent is extended or adjusted under 35 U.S.C. 154(b) by 840 days.

(21) Appl. No.: 11/420,416

(22) Filed: May 25, 2006

(65) Prior Publication Data

US 2007/0027251 A1    Feb. 1, 2007

(30) Foreign Application Priority Data

Jul. 15, 2005  (GB)  .................. 0514387.0
Jul. 15, 2005  (GB)  .................. 0514398.7
Nov. 24, 2005  (GB)  .................. 0523853.0
Dec. 21, 2005  (GB)  .................. 0525978.3

(51) Int. Cl.
  *C08L 1/00*  (2006.01)
(52) U.S. Cl. .............. 523/310; 524/544; 524/700; 524/800; 524/805; 526/249; 526/250; 556/4
(58) Field of Classification Search ............... 523/310; 524/544, 700, 800, 805; 526/249, 250; 556/4
  See application file for complete search history.

(56) References Cited

U.S. PATENT DOCUMENTS

| | | |
|---|---|---|
| 2,516,127 A | 7/1950 | Lauer et al. |
| 2,559,752 A | 7/1951 | Berry |
| 3,142,665 A | 7/1964 | Cardinal et al. |
| 3,271,341 A * | 9/1966 | Garrison, Jr. ............... 524/777 |
| 3,451,908 A | 6/1969 | Sianesi et al. |
| 3,555,100 A | 1/1971 | Garth et al. |
| 3,635,926 A | 1/1972 | Gresham et al. |
| 3,642,742 A | 2/1972 | Carlson |
| 3,721,696 A | 3/1973 | Sianesi et al. |
| 3,816,524 A | 6/1974 | Grinstead |
| 3,855,191 A | 12/1974 | Doughty, Jr. et al. |
| 3,882,153 A | 5/1975 | Seki et al. |
| 3,997,599 A | 12/1976 | Grinstead |
| 4,005,137 A | 1/1977 | Rudolph et al. |
| 4,010,156 A | 3/1977 | Nudelman et al. |
| 4,025,709 A | 5/1977 | Blaise et al. |
| 4,060,535 A | 11/1977 | Cinco |
| 4,138,373 A | 2/1979 | Ukihashi et al. |
| 4,262,101 A | 4/1981 | Hartwimmer et al. |
| 4,282,162 A | 8/1981 | Kuhls |
| 4,320,205 A | 3/1982 | Asawa et al. |
| 4,369,266 A | 1/1983 | Kuhls et al. |
| 4,380,618 A | 4/1983 | Khan et al. |
| 4,381,384 A | 4/1983 | Khan |
| 4,439,385 A | 3/1984 | Kuhls et al. |
| 4,588,796 A | 5/1986 | Wheland |
| 4,603,118 A | 7/1986 | Staab |
| 4,605,773 A | 8/1986 | Maloney et al. |
| 4,609,497 A | 9/1986 | Cope |
| 4,618,641 A | 10/1986 | Hengel |
| 4,621,116 A | 11/1986 | Morgan |
| 4,623,487 A | 11/1986 | Cope |
| 4,639,337 A | 1/1987 | Cope et al. |
| 4,789,717 A | 12/1988 | Giannetti et al. |
| 4,847,135 A | 7/1989 | Braus et al. |
| 4,861,845 A | 8/1989 | Slocum et al. |
| 4,864,006 A | 9/1989 | Giannetti et al. |
| 4,925,709 A | 5/1990 | Shmueli |
| 4,987,254 A | 1/1991 | Schwertfeger et al. |
| 5,017,480 A | 5/1991 | Mori et al. |
| 5,090,613 A | 2/1992 | Lee |
| 5,285,002 A | 2/1994 | Grootaert |
| 5,312,935 A | 5/1994 | Mayer et al. |
| 5,442,097 A | 8/1995 | Obermeier et al. |
| 5,453,477 A | 9/1995 | Oxenrider et al. |
| 5,498,680 A | 3/1996 | Abusleme et al. |
| 5,530,078 A | 6/1996 | Felix et al. |
| 5,532,310 A | 7/1996 | Grenfell et al. |
| 5,591,877 A | 1/1997 | Obermeier et al. |
| 5,656,201 A | 8/1997 | Visca et al. |
| 5,663,255 A | 9/1997 | Anolick et al. |
| 5,688,884 A | 11/1997 | Baker et al. |
| 5,763,552 A | 6/1998 | Feiring et al. |
| 5,789,508 A | 8/1998 | Baker et al. |
| 5,955,556 A | 9/1999 | McCarthy et al. |

(Continued)

FOREIGN PATENT DOCUMENTS

BE  834885  4/1976

(Continued)

OTHER PUBLICATIONS

Chi, K., et al., "A Facile Synthesis of Partly-fluorinated Ethers Using Perfluoropropoxyethylene and Aliphatic Alcohols" *Bull. Korean Chem. Soc.*, vol. 20, No. 2, pp. 220-222 [1999].
Encyclopedia of Chemical Technology, Kirk-Othmer, Third Edition, John Wiley & Sons, vol. 13, p. 687 (1981).

(Continued)

*Primary Examiner*—Peter D. Mulcahy
*Assistant Examiner*—Henry Hu
(74) *Attorney, Agent, or Firm*—Dena M Ehrich; Brian E. Szymanski

(57) ABSTRACT

A method for removing a fluorinated carboxylic acid or salt thereof from an aqueous liquid by contacting the aqueous liquid with adsorbent particles. The fluorinated carboxylic acid or salt thereof is selected from the group consisting of partially fluorinated carboxylic acids or salts thereof and fully fluorinated carboxylic acids or salts thereof.

23 Claims, No Drawings

U.S. PATENT DOCUMENTS

| | | | |
|---|---|---|---|
| 5,990,330 A | 11/1999 | Sulzbach et al. |
| 6,013,795 A | 1/2000 | Manzara et al. |
| 6,025,441 A | 2/2000 | Koshirai et al. |
| 6,103,844 A | 8/2000 | Brothers |
| 6,136,893 A * | 10/2000 | Yamashita et al. | 523/310 |
| 6,245,923 B1 | 6/2001 | Sulzbach et al. |
| 6,255,384 B1 | 7/2001 | McCarthy et al. |
| 6,255,536 B1 | 7/2001 | Worm et al. |
| 6,365,684 B1 | 4/2002 | McCarthy et al. |
| 6,395,848 B1 | 5/2002 | Morgan et al. |
| 6,429,258 B1 | 8/2002 | Morgan et al. |
| 6,436,244 B1 | 8/2002 | Fuher et al. |
| 6,482,979 B1 | 11/2002 | Hintzer et al. |
| 6,503,988 B1 | 1/2003 | Kitahara et al. |
| 6,512,063 B2 | 1/2003 | Tang |
| 6,512,089 B1 | 1/2003 | Hintzer et al. |
| 6,518,442 B1 | 2/2003 | Felix et al. |
| 6,576,703 B2 | 6/2003 | Kapeliouchko et al. |
| 6,593,416 B2 | 7/2003 | Grootaert et al. |
| 6,613,941 B1 | 9/2003 | Felix et al. |
| 6,642,415 B1 | 11/2003 | Fuhrer et al. |
| 6,693,152 B2 | 2/2004 | Kasper et al. |
| 6,703,520 B2 | 3/2004 | Hintzer et al. |
| 6,706,193 B1 * | 3/2004 | Burkard et al. | 210/662 |
| 6,715,877 B2 | 4/2004 | Molebny |
| 6,720,437 B2 | 4/2004 | Jones et al. |
| 6,729,437 B1 | 5/2004 | Apple |
| 6,750,304 B2 | 6/2004 | Kaspar et al. |
| 6,774,164 B2 | 8/2004 | Lyons et al. |
| 6,774,166 B1 | 8/2004 | Eichenauer et al. |
| 6,825,250 B2 | 11/2004 | Epsch et al. |
| 6,833,403 B1 * | 12/2004 | Bladel et al. | 524/458 |
| 6,861,466 B2 | 3/2005 | Dadalas et al. |
| 6,861,490 B2 | 3/2005 | Kaspar et al. |
| 6,878,772 B2 | 4/2005 | Visca et al. |
| 6,972,094 B2 | 12/2005 | Ichida et al. |
| 7,018,541 B2 | 3/2006 | Hintzer et al. |
| 7,045,571 B2 * | 5/2006 | Tan et al. | 524/801 |
| 7,045,591 B2 | 5/2006 | Chen et al. |
| 7,074,862 B2 | 7/2006 | Kaspar et al. |
| 7,125,941 B2 | 10/2006 | Kaulbach et al. |
| 7,126,016 B2 | 10/2006 | Fu et al. |
| 7,141,620 B2 | 11/2006 | Hoshikawa et al. |
| 2001/0020063 A1 | 9/2001 | Kapeliouchko et al. |
| 2002/0040119 A1 | 4/2002 | Tang |
| 2002/0062161 A1 | 5/2002 | Dusterhoft |
| 2002/0114421 A1 | 8/2002 | Erbes et al. |
| 2002/0139593 A1 | 10/2002 | Charaudeau et al. |
| 2002/0193500 A1 | 12/2002 | Hintzer et al. |
| 2002/0198334 A1 | 12/2002 | Kaspar et al. |
| 2003/0018148 A1 | 1/2003 | Kaspar et al. |
| 2003/0153674 A1 * | 8/2003 | Visca et al. | 524/801 |
| 2003/0181572 A1 | 9/2003 | Tan et al. |
| 2003/0220442 A1 | 11/2003 | Epsch et al. |
| 2004/0010156 A1 | 1/2004 | Kondo et al. |
| 2004/0016742 A1 | 1/2004 | Miyazaki |
| 2004/0072977 A1 | 4/2004 | Kaulbach et al. |
| 2004/0087703 A1 | 5/2004 | Kaspar et al. |
| 2004/0101561 A1 | 5/2004 | Jafari et al. |
| 2004/0116742 A1 | 6/2004 | Guerra |
| 2004/0131782 A1 | 7/2004 | Hasei et al. |
| 2004/0132939 A1 | 7/2004 | Kaspar et al. |
| 2004/0143052 A1 | 7/2004 | Epsch et al. |
| 2004/0186219 A1 | 9/2004 | Dadalas et al. |
| 2004/0235986 A1 | 11/2004 | Kaspar et al. |
| 2005/0000904 A1 | 1/2005 | Le Bec |
| 2005/0038177 A1 | 2/2005 | Hoshikawa et al. |
| 2005/0043471 A1 | 2/2005 | Epsch et al. |
| 2005/0070633 A1 | 3/2005 | Epsch et al. |
| 2005/0090601 A1 | 4/2005 | Dadalas et al. |
| 2005/0090613 A1 | 4/2005 | Maruya et al. |
| 2005/0113507 A1 | 5/2005 | Bladel et al. |
| 2005/0150833 A1 | 7/2005 | Funaki et al. |
| 2005/0154104 A1 | 7/2005 | Malvasi et al. |
| 2005/0171381 A1 | 8/2005 | Fu et al. |
| 2005/0173347 A1 | 8/2005 | Hintzer et al. |
| 2005/0177000 A1 | 8/2005 | Fuhrer et al. |
| 2005/0192397 A1 | 9/2005 | Dadalas et al. |
| 2006/0014886 A1 | 1/2006 | Hintzer et al. |
| 2006/0041051 A1 | 2/2006 | Nakatani et al. |
| 2006/0160947 A1 | 7/2006 | Tan et al. |
| 2006/0281946 A1 | 12/2006 | Morita et al. |
| 2007/0015937 A1 | 1/2007 | Hintzer et al. |
| 2007/0027251 A1 | 2/2007 | Hintzer et al. |
| 2007/0117915 A1 | 5/2007 | Funaki et al. |
| 2007/0135558 A1 | 6/2007 | Tsuda et al. |
| 2007/0149733 A1 | 6/2007 | Otsuka et al. |
| 2007/0155891 A1 | 7/2007 | Tsuda et al. |

FOREIGN PATENT DOCUMENTS

| | | |
|---|---|---|
| DE | 38 28 063 | 2/1990 |
| EP | 0 030 663 | 10/1983 |
| EP | 0 222 945 | 5/1987 |
| EP | 0 649 863 | 4/1995 |
| EP | 0 822 226 | 2/1998 |
| EP | 0 861 856 | 9/1998 |
| EP | 0 964 009 | 12/1999 |
| EP | 1 069 078 | 1/2001 |
| EP | 1 084 097 | 3/2001 |
| EP | 1 093 441 | 4/2001 |
| EP | 1334996 A3 * | 3/2004 |
| EP | 1 514 848 | 3/2005 |
| EP | 1 529 785 | 5/2005 |
| FR | 814839 | 6/1937 |
| GB | 1 127 521 | 9/1968 |
| GB | 1 473 447 | 5/1977 |
| JP | 46-11031 | 8/1966 |
| JP | 2002-308914 | 10/2002 |
| JP | 2002-317003 | 10/2002 |
| JP | 2003-119204 | 4/2003 |
| JP | 2003-212919 | 7/2003 |
| JP | 2003-284921 | 10/2003 |
| JP | 2004-358397 | 12/2004 |
| JP | 2004-359870 | 12/2004 |
| JP | 2005-008775 | 1/2005 |
| JP | 2005-105045 | 4/2005 |
| RU | 2158274 | 10/2000 |
| WO | WO 96/24622 | 8/1996 |
| WO | WO 97/17381 | 5/1997 |
| WO | WO 99/62830 | 12/1999 |
| WO | WO 99/62858 | 12/1999 |
| WO | WO 00/35971 | 6/2000 |
| WO | WO 01/32563 | 5/2001 |
| WO | WO 01/57096 | 8/2001 |
| WO | WO 02/088203 | 11/2002 |
| WO | WO 02/088206 | 11/2002 |
| WO | WO 02/088207 | 11/2002 |
| WO | WO 02/088248 | 11/2002 |
| WO | WO 2005/065800 | 7/2005 |
| WO | WO 2005/082785 | 9/2005 |
| WO | WO 2005/121290 | 12/2005 |
| WO | WO 2006/020721 | 2/2006 |
| WO | WO 03/051988 | 6/2006 |

OTHER PUBLICATIONS

Encyclopedia of Polymer Science and Engineering, John Wiley & Sons, vol. 8, p. 347 (1987).
England, D. C., "Catalytic Conversion of Fluoroalkyl Alkyl Ethers to Carbonyl Compounds", *J. Org. Chem.* vol. 49, pp. 4007-4008 (1984).
Mark, et al., Encyclopedia of Polymer Science and Engineering, John Wiley & Sons, vol. 16, p. 580 (1989).
Modern Fluoropolymers, High Performance Polymers for Diverse Applications, edited by John Scheirs (ed), John Wiley & Sons (1997).

* cited by examiner

METHOD OF REMOVING FLUORINATED CARBOXYLIC ACID FROM AQUEOUS LIQUID

CROSS-REFERENCE TO RELATED APPLICATIONS

This application claims priority to Great Britain Application No. 0525978.3, filed on Dec. 21, 2005; Great Britain Application No. 0523853.0, filed on Nov. 24, 2005; Great Britain Application No. 0514398.7, filed on Jul. 15, 2005; and Great Britain Application No. 0514387.0 filed on Jul. 15, 2005, all of which are herein incorporated by reference in their entirety.

The present invention relates to the removal, including recovery of fluorinated carboxylic acids or salts thereof from an aqueous liquid, in particular a waste water produced during the manufacturing of fluoropolymer. The present invention relates in particular to a method wherein the fluorinated carboxylic acid or salt thereof is removed from an aqueous liquid by contacting the latter with adsorbent particles.

Polymerization of fluoroolefins to manufacture fluoropolymers, i.e. polymers having a fluorinated backbone, is often performed in aqueous media. In one such process referred to as emulsion polymerization, fluorinated carboxylic acids are typically used as surfactants in the aqueous media. Examples of these fluorosurfactants include the perfluorinated alkanecarboxylic acids having 7 to 10 carbon atoms, in particular perfluorooctanoic acid (PFOA). These acids are generally used in the salt form, preferably as ammonium salts. Fluoropolymerization to make "granular fluoropolymer" is also done in aqueous media in a process sometimes referred to as suspension polymerization, though with less fluorosurfactant (or none) than is used in dispersion polymerization. For a discussion of the processes, see "Tetrafluoroethylene Polymers" in the Encyclopedia of Polymer Science and Engineering, John Wiley & Sons, New York, 1989, Vol. 16, p. 580.

Following the aqueous emulsion polymerization, the resulting dispersion may be upconcentrated to obtain a dispersion with desired solids content for use in coating applications, or alternatively, the fluoropolymer may be recovered from the dispersion by coagulation. The waste water produced in these 'work-up' processes generally contains the fluorosurfactant used in the polymerization. Because this compound is an expensive compound and because it is undesirable to release the compound in the environment, processes have been developed to recover the surfactant from aqueous liquids and in particular from fluoropolymer production waste water streams.

Known processes have been reviewed in EP 1514848 and a particular effective method involves treating the aqueous liquid with adsorbent particles including for example an anion exchange resin as disclosed in EP 1093441, EP 1084097 or other adsorbent particles such as activated carbon particles as disclosed in WO 2005/082785. These processes are typically practiced for recovering perfluorooctanoic acid or salts thereof, which is the most widely used surfactant in making fluoropolymers through aqueous emulsion polymerization. Unfortunately, these surfactants eliminate only slowly from the body of living organisms and they hence show bioaccumulation. Notwithstanding the fact that these surfactants are recovered from waste water using the aforementioned processes, these processes themselves are disadvantageous because operators of these processes may come into contact with the surfactants or derivatives thereof and hence special measures are typically necessary to avoid such contact or to at least minimize exposure of the operators to these compounds. Furthermore, the recovery may not be complete and there may still, albeit generally an extremely small amount, of the surfactant remain in the waste water.

There was therefore a desire to find alternative surfactants that can be used in the making of fluoropolymers in aqueous emulsion polymerization and that can be recovered from waste water streams of the polymer production using adsorbent particles. It was in particular desirable to find alternative surfactants that eliminate faster from the body of living organisms and that thus have lower bioaccumulation than perfluorooctanoic acid or salts thereof.

In one aspect of the present invention, there is provided a method of removing a fluorinated carboxylic acid or salt thereof from an aqueous liquid by contacting the aqueous liquid with adsorbent particles, wherein said fluorinated carboxylic acid or salt thereof is selected from the group consisting of (i) partially fluorinated carboxylic acids or salts thereof corresponding to the general formula:

$$[PF^1-O-L^1-COO^-]_i X^{i+} \quad (I)$$

wherein $PF^1$ represents a linear partially or fully fluorinated aliphatic group or a linear partially or fully fluorinated aliphatic group interrupted with one or more oxygen atoms, $L^1$ represents a linear partially or fully fluorinated alkylene group or an aliphatic hydrocarbon group with the proviso that when $PF^1$ is fully fluorinated, $L^1$ is a linear partially fluorinated alkylene group or an aliphatic hydrocarbon group, $X^{i+}$ represents a cation having the valence i and i is 1, 2 or 3; and (ii) fully fluorinated carboxylic acids or salts thereof corresponding to one of the following general formulas:

$$[PF^2-O-(CF_2)_p-COO^-]_i X^{i+} \quad (II)$$

wherein $PF^2$ represents a linear fully fluorinated aliphatic group or a linear fully fluorinated aliphatic group interrupted with one or more oxygen atoms, p is an integer of 2 to 6 and $X^{i-}$ and i have the same meaning as in formula (I); or $$[PF^3-(L^2)_f-O-CF_2-COO^-]_i X^{i+} \quad (III)$$

wherein $PF^3$ represents a linear fully fluorinated aliphatic group or a linear fully fluorinated aliphatic group interrupted with one or more oxygen atoms, $L^2$ represents $-O(CF_2)_x-$ wherein x is an integer of 1 or 3 to 6, $-(O-CF_2CF_2)_s-$ wherein s is 1, 2 or 3 or $-(OCF_2)_u-$ wherein u is an integer of 1 to 6, f is 0 or 1 with the proviso that when f is 0, $PF^3$ represents $F(CF_2)_l-$ wherein l is 1, 2, 4, 5 or 6 and with the proviso that when f is 1 and $L^2$ represents $-(O-CF_2CF_2)_s-$, $PF^3$ represents $CF_3$ or $CF_3CF_2$ and $X^{i+}$ and i have the same meaning as in formula (I).

It has been found that the fluorinated carboxylic acids or salts thereof according to formula (I) to (III) are suitable for making fluoropolymers by aqueous emulsion polymerization. It has further been found that these compounds can be recovered from an aqueous liquid and in particular from waste water by contact with adsorbent particles. Furthermore, the fluorinated carboxylic acids or salts thereof have lower bioaccumulation than perfluorooctanoic acids or salts thereof.

Fluorinated Carboxylic Acids or Salts Thereof

For the sake of convenience, the term 'fluorinated carboxylic acid' is hereinafter used to indicate the free acid as well as salts thereof. The fluorinated carboxylic acid used in the process of the invention corresponds to formula (I), (II) or (III) above. Generally, the fluorinated carboxylic acid anion will be a low molecular weight compound, for example a compound having a molecular weight of not more than 1000 g/mol, typically not more than 600 g/mol and in particular embodiments, the fluorinated carboxylic acid anion may have a molecular weight of not more than 500 g/mol.

Particularly preferred fluorinated carboxylic acids are those that when administered to rats show a recovery of at least 45%, for example at least 50% of the administered amount after 96 hours via renal elimination and that have a renal elimination half-life of not more than 35 hours, for example of not more than 30 hours in rats as tested according to the method set forth in the examples. Generally, fluorinated carboxylic acids in which each of the fluorinated aliphatic moieties in the compound have not more than 3 carbon atoms fulfill the aforementioned conditions of renal recovery and half-life. Thus, preferred compounds are those in which any fluorinated alkylene groups have not more than 3 carbon atoms and in which a fluorinated alkyl group of the compound has not more than 3 carbon atoms.

In one embodiment, the fluorinated carboxylic acids correspond to the above formula (I). In this formula (I) $L^1$ represents a linking group. In one embodiment, the linking group $L^1$ can be a linear partially or fully fluorinated alkylene. Fully fluorinated alkylene groups include alkylene groups that consist of only carbon and fluorine atoms whereas partially fluorinated alkylene groups may additionally contain hydrogen. Generally, a partially fluorinated alkylene group should not contain more than 2 hydrogen atoms so as to be highly fluorinated. Examples of fully fluorinated alkylene groups include linear perfluorinated alkylenes that have from 1 to 6 carbon atoms, for example linear perfluorinated alkylene groups of 2, 3, 4 or 5 carbon atoms.

Examples of linear partially fluorinated alkylene groups include those that have from 1 to 6 carbon atoms. In a particular embodiment the linear partially fluorinated alkylene linking group has 1, 2, 3, 4, 5 or 6 carbon atoms and has only 1 or 2 hydrogen atoms. When the partially fluorinated alkylene group has 2 hydrogen atoms, they may be attached to the same carbon atom or they can be attached to different carbon atoms. When they are attached to different carbon atoms, such carbon atoms can be adjacent to each other or not. Also, in a particular embodiment, a carbon atom having 1 or 2 hydrogen atoms may be adjacent the ether oxygen atom to which the linking group is attached or adjacent the carboxylic group to which the linking group is attached at its other end.

In a further embodiment, the linking group $L^1$ is an aliphatic hydrocarbon group. Examples of aliphatic hydrocarbon groups include linear, branched or cyclic aliphatic groups. Particular examples of aliphatic groups include linear or branched alkylene groups of 1 to 4 carbon atoms such as for example methylene or ethylene.

Particular examples of linking groups $L^1$ may be selected from the following:

—$(CF_2)_g$— wherein g is 1, 2, 3, 4, 5 or 6;
—$CFH$—$(CF_2)_h$— wherein h is 0, 1, 2, 3, 4 or 5;
—$CF_2$—$CFH$—$(CF_2)_d$— wherein d is 0, 1, 2, 3 or 4;
—$CH_2$—$(CF_2)_h$— wherein h is 1, 2, 3 or 4;
—$(CH_2)_c$— wherein c is 1, 2, 3 or 4;

The $PF^1$ group in formula (I) represents a linear partially or fully fluorinated aliphatic group or a linear partially or fully fluorinated aliphatic group interrupted with one or more oxygen atoms. In one embodiment, $PF^1$ is a linear perfluorinated aliphatic group having 1 to 6 carbon atoms, preferably having 1, 2, 3 or 4 carbon atoms. According to another embodiment $PF^1$ is a linear perfluorinated aliphatic group interrupted with one or more oxygen atoms of which the alkylene groups between oxygen atoms have not more than 4 or 6 carbon atoms and wherein the terminal alkyl group has not more than 4 or 6 carbon atoms. According to a still further embodiment, $PF^1$ is a linear partially fluorinated aliphatic group having 1 to 6 carbon atoms and not more than 2 hydrogen atoms or a linear partially fluorinated aliphatic group interrupted with one or more oxygen atoms and which has not more than 2 hydrogen atoms. In the latter embodiment, it will generally be preferred that any perfluorinated alkylene moiety has not more than 4 or 6 carbon atoms and any terminal perfluorinated alkyl group, likewise preferably should not have more than 6 carbon atoms, for example not more than 4 carbon atoms. A particular example of a partially fluorinated aliphatic group $PF^1$ is $CF_3CFH$—.

In a particular embodiment, $PF^1$ may correspond to the following formula:

wherein $R_f^1$ is a perfluorinated linear aliphatic group of 1 to 6 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1.

In another embodiment, $PF^1$ may correspond to the following formula:

wherein t is 0 or 1 and $R_f^7$ represents a linear partially or fully fluorinated aliphatic group optionally interrupted with one or more oxygen atoms. Typically $R_f^7$ does not contain perfluorinated aliphatic moieties of more than 4 or 6 carbon atoms. For example, in one embodiment, $R_f^7$ is a linear perfluorinated linear aliphatic group of 1 to 6 carbon atoms. In another embodiment, $R_f^7$ is a group corresponding to above formula (A).

In yet a further embodiment, $PF^1$ may correspond to the following formula:

wherein a is an integer of 1 to 6 and $R_f^8$ is a linear partially fluorinated aliphatic group or a linear fully fluorinated aliphatic group having 1, 2, 3 or 4 carbon atoms. When $R_f^8$ is a linear partially fluorinated aliphatic group, the number of carbon atoms preferably is between 1 and 6 and the number of hydrogen atoms in the partially fluorinated aliphatic groups is preferably 1 or 2.

In a still further embodiment, $PF^1$ may correspond to the following formula:

wherein b is an integer of 1 to 6, preferably 1, 2, 3 or 4 and $R_f^9$ is a linear partially fluorinated aliphatic group or a linear fully fluorinated aliphatic group having 1, 2, 3 or 4 carbon atoms. When $R_f^9$ is a partially fluorinated aliphatic group, the number of carbon atoms preferably is between 1 and 6 and the number of hydrogen atoms in the partially fluorinated aliphatic groups is preferably 1 or 2.

Fluorinated carboxylic acids according to formula (I) are partially fluorinated and hence at least one $PF^1$ or $L^1$ should include one or more hydrogen atoms. Accordingly either or both of $PF^1$ or $L^1$ should be selected from partially fluorinated groups. Alternatively, a partially fluorinated compound is obtained if $L^1$ is an aliphatic hydrocarbon group.

In another embodiment of the present invention, the fluorinated carboxylic acid is a fully fluorinated compound, i.e. does not contain hydrogen atoms. One embodiment of the method involving fully fluorinated carboxylic acids involves the use of fluorinated carboxylic acids that correspond to formula (II) above. In the above formula (II) PF² represents a linear fully fluorinated aliphatic group or a linear fully fluorinated aliphatic group interrupted with one or more oxygen atoms. In one embodiment, PF² is a linear perfluorinated aliphatic group having 1 to 6 carbon atoms, preferably having 1, 2, 3 or 4 carbon atoms. According to another embodiment PF² is a linear perfluorinated aliphatic group interrupted with one or more oxygen atoms of which the alkylene groups between oxygen atoms have not more than 4 or 6 carbon atoms and wherein the terminal alkyl group has not more than 4 or 6 carbon atoms.

In a particular embodiment PF² may be a group corresponding to formula (A) above. In yet another embodiment, PF² may correspond to formula (C) wherein $R_f^8$ is a linear fully fluorinated aliphatic group having 1, 2, 3 or 4 carbon atoms. In yet another embodiment, PF² corresponds to formula (D) wherein $R_f^9$ is a linear fully fluorinated aliphatic group having 1, 2, 3 or 4 carbon atoms.

According to a further embodiment, the fully fluorinated carboxylic acid corresponds to formula (III) above. Compounds according to formula (III) that may be used include those in which PF³ represents a linear fully fluorinated aliphatic group or a linear fully fluorinated aliphatic group interrupted with one or more oxygen atoms. Examples thereof include those described in connection with the perfluorinated group PF² described above in connection with formula (II). Linking group L² in formula (III) is selected from —O(CF₂)$_x$— wherein x is an integer of 1 or 3 to 6, such as for example 3, 4 or 5 or —(OCF₂)$_u$— wherein u is an integer of 1 to 6 such as for example 2, 3, 4 or 5. Linking group L² may further represent —(O—CF₂CF₂)$_s$—, but in that case PF³ represents either CF₃ or CF₃CF₂. Linking group L² in formula (III) is optional as indicated by the index f which can be 0 or 1. Hence in connection with a particular embodiment, f is 0. In such case, PF³ is selected from linear perfluorinated aliphatic groups having 1, 2, 4, 5 or 6 carbon atoms.

In accordance with a particular embodiment of the present invention, a mixture of fluorinated carboxylic acids or salts may be recovered from the aqueous liquid. In particular, the mixture may include a mixture of compounds according formula (I), formula (II) or formula (III) or any combination thereof. Generally, the method is practiced with respect to aqueous liquids that do not include perfluoroalkanoic acids or salts thereof.

In a particular embodiment of the present invention, the fluorinated carboxylic acid corresponds to the following formula:

wherein $R_f^a$ represents a partially or fully fluorinated aliphatic group optionally interrupted with one or more oxygen atoms, t is 0 or 1 and n is 0 or 1, $X^{i+}$ represents a cation having a valence i and i is 1, 2 or 3, with the proviso that when t is 0, the $R_f^a$ contains at least one ether oxygen atom.

In a particular aspect of this embodiment, the $R_f^a$ is selected from the group consisting of linear perfluorinated aliphatic groups of 1 to 6 carbon atoms, preferably having 1 to 4 carbon atoms, perfluorinated groups of the formula $R_f^1$—[OR$_f^2$]$_p$—[OR$_f^3$]$_q$— wherein $R_f^1$ is a linear perfluorinated aliphatic group of 1 to 6 carbon atoms, preferably 1 to 4 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1 and perfluorinated groups of the formula $R_f^4$—[OR$_f^5$]$_k$—[OR$_f^6$]$_m$—O—CF₂— wherein $R_f^4$ is a linear perfluorinated aliphatic group of 1 to 6 carbon atoms, preferably 1 to 4 carbon atoms, $R_f^5$ and $R_f^6$ each independently represents a linear perfluorinated alkylene of 1, 2, 3 or 4 carbon atoms and k and m each independently represent a value of 0 to 4.

Fluorinated carboxylic acid of formula (IV) can be derived from fluorinated olefins of the general formula:

wherein $R_f^a$ and t are as defined above. Compounds according to formula (IVa) are well known in the art and include fluorinated olefins such as perfluorinated alkyl vinyl compounds, vinyl ethers in particular perfluorovinyl ethers and allyl ethers, in particular perfluorinated allyl ethers.

Fluorinated carboxylic acids according to formula (IV) wherein n is 0 can be prepared by reacting a fluorinated olefin of formula (IVa) with a base. The reaction is generally carried out in aqueous media. An organic solvent may be added to improve the solubility of the fluorinated olefin. Examples of organic solvents include glyme, tetrahydrofuran (THF) and acetonitrile. Additionally or alternatively a phase transfer catalyst may be used. As a base, use can be made of for example ammonia, alkali and earth alkali hydroxides. Without intending to be bound by any theory, it is believed, that the reaction proceeds according to the following sequence when ammonia is used as a base:

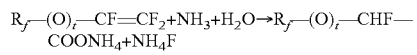

The reaction is generally carried out between 0 and 200° C., for example between 20-150° C. and at a pressure between about 1 bar up to about 20 bar. For further purification, the obtained salts can be distilled via the free acid or by first converting the acid into an ester derivative and then distilling the ester derivative followed by hydolysis of the ester to obtain the purified acid or salt thereof.

Fluorinated carboxylic acids of formula (IV) wherein n is 0 can also be prepared by reacting a fluorinated olefin of formula (IVa) with a hydrocarbon alcohol in an alkaline medium and then decomposing the resulting ether in acidic conditions thereby forming the corresponding carboxylic acid. Suitable hydrocarbon alcohols include aliphatic alcohols such as lower alkanols having 1 to 4 carbon atoms. Specific examples include methanol, ethanol and butanol including t-butanol. The reaction of the fluorinated olefin with the alcohol in an alkaline medium may be carried out as described in "Furin et al., Bull Korean Chem. Soc. 20, 220 [1999]". The reaction product of this reaction is an ether derivative of the fluorinated olefin. This resulting ether can be decomposed under acidic conditions as described in "D. C. England, J. Org. Chem. 49, 4007 (1984)" to yield the corresponding carboxylic acid or salt thereof.

To prepare fluorinated carboxylic acids of formula (IV) wherein n is 1, a free radical reaction of the fluorinated olefin of formula (IVa) with methanol may be carried out followed by an oxidation of the resulting reaction product. The free radical reaction is typically carried out using a free radical initiator as is typically used in a free radical polymerization reaction. Examples of suitable free radical initiators include persulfates such as for example ammonium persulfate. Detailed conditions of the free radical reaction of the fluorinated carboxylic acid with an alcohol can be found in "S. V. Sokolov et al., Zh. Vses. Khim Obsh 24, 656 (1979)". The resulting alcohol derivative of the fluorinated olefin can be chemically oxidized with an oxidizing agent to the corresponding carboxylic acid. Examples of oxidizing agents include for example potassium permanganate, chromium (VI) oxide, RuO₄ or OsO₄ optionally in the presence of NaOCl, nitric acid/iron catalyst, dinitrogen tetroxide. Typically the oxidation is carried out in acidic or basic conditions at a temperature between 10 and 100° C. In addition to chemical oxidation, electrochemical oxidation may be used as well.

In another embodiment, the fluorinated carboxylic acid corresponds to the following formula:

$$R_f^b—(O)_t—CFH—CF_2—O—R-G \qquad (V)$$

wherein $R_f^b$ represents a linear partially or fully fluorinated aliphatic group optionally interrupted with one or more oxygen atoms, R is an aliphatic hydrocarbon group, G represents a carboxylic acid or salt thereof, t is 0 or 1. Particular examples for R include a methylene or ethylene group.

In a particular aspect of this embodiment, the $R_f^b$ is selected from the group consisting of linear perfluorinated aliphatic groups of 1 to 6 carbon atoms, preferably having 1 to 4 carbon atoms, perfluorinated groups of the formula $R_f^1—[OR_f^2]_p—[OR_f^3]_q—$ wherein $R_f^1$ is a linear perfluorinated aliphatic group of 1 to 6 carbon atoms, preferably 1 to 4 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1 and perfluorinated groups of the formula $R_f^4—[OR_f^5]_k—[OR_f^6]_m—O—CF_2—$ wherein $R_f^4$ is a linear perfluorinated aliphatic group of 1 to 6 carbon atoms, preferably 1 to 4 carbon atoms, $R_f^5$ and $R_f^6$ each independently represents a linear perfluorinated alkylene of 1, 2, 3 or 4 carbon atoms and k and m each independently represent a value of 0 to 4.

Fluorinated carboxylic acids according to formula (V) may be prepared through the preparation of an intermediate of formula (Va):

$$R_f^b—(O)_t—CFH—CF_2—O—R—Z \qquad (Va)$$

wherein $R_f^b$, t and R have the same meaning as defined above. Z represents a carboxylic acid ester or a carboxylamide.

The intermediate compound according to formula (Va) can be prepared by reacting a fluorinated olefin of the general formula (IVa) with an organic compound of the formula

$$HO—R—Z \qquad (Vb)$$

wherein Z and R are as defined above. Compounds according to formula (Vb) are well known in the art and/or are commercially available. The reaction of compound (IVa) with compound (Vb) is typically carried out in the presence of a base although it is also possible to carry out the reaction under acidic or neutral conditions. Suitable bases include carbonates such as potassium carbonate, sodium carbonate and lithium carbonate, hydroxides, alkoholates etc. The amount of base used may vary widely. For example a catalytic amount may be used. Generally the amount of base used will be about at least 1 or 2% by weight based on the amount of reactant of formula (Vb). In a particular embodiment, the amount of base can be upto 2 times the molar amount of the reactant of formula (Vb). The reaction is typically carried out in an aprotic solvent such as for example, tetrahydrofuran, acetonitrile, glyme, diglyme etc. Further suitable aprotic solvents are disclosed in DE 3828063. The reaction is typically carried out a temperature between 0 and 200° C., for example between 10 and 150° C. The reaction is generally carried out at an ambient pressure (1 bar) or up to 20 bar. Following the reaction, the resulting compound may be isolated and purified by distillation.

The fluorinated carboxylic acids of formula (V) can be readily prepared by hydrolyzing the intermediate compound of formula (Va) above. In formula (Va) above, Z represents a carboxylic acid ester or a carboxylamide. Typically a carboxylic acid ester is used. In one embodiment, the ester can be an aliphatic ester, e.g. an alkyl ester in which the number of carbon atoms in the alkyl group are from 1 to 4. Hydrolysis of the intermediate compound may be carried out under acidic or basic conditions and is generally carried out in an alcoholic acidic or basic solution of the intermediate compound. Alternatively the intermediate compound may be hydrolysed in an acidic or basic solution of other water miscible organic solvents such as ketones, ethers etc. Typically, a basic alcoholic solution is used such as for example a methanol or ethanol solution containing an alkali metal hydroxide as the base. Typically the hydrolysis is carried out at room temperature but it is also possible to use elevated temperatures of for example up to the boiling point of the solution.

Alternatively, the fluorinated surfactant may be prepared by reacting the fluorinated olefin of formula (IVa) above with a hydroxy substituted carboxylic acid or salt thereof. Thus, in accordance with this embodiment the fluorinated olefin of formula (IVa) is reacted with a compound of the formula:

$$HO—R-G \qquad (Vc)$$

wherein G is a carboxylic acid group or salt thereof and R is as defined above. The reaction of a fluorinated olefin of formula (IVa) with a hydroxy compound or formula (Vc) can be carried out under the same conditions described above for the reaction with compounds of formula (Vb).

In a still further embodiment, the fluorinated carboxylic acid corresponds to one of the following formulas:

$$R_f^c—(OCF_2)_u—O—(CF_2)_v\text{-AC} \qquad (VI)$$

wherein u is an integer of 1 to 6, v is an integer of 1 to 6, $R_f^c$ represents a linear perfluorinated aliphatic group of 1, 2, 3 or 4 carbon atoms and AC represents a carboxylic acid group or salt thereof, and

$$R_f^c—O—(CF_2)_y—O-L^1\text{-AC} \qquad (VII)$$

wherein y has a value of 1, 3, 4, 5 or 6, $L^1$ represents a linear perfluorinated alkylene of 1, 2, 3, 4, 5 or 6 carbon atoms or a linear partially fluorinated alkylene having 1 to 6 carbon atoms and 1 or 2 hydrogen atoms, $R_f^c$ is as defined in above formula (VI) and AC represents a carboxylic acid group or salt thereof A particular example for $L^1$ includes a group of the formula —CFH—. Particular compounds according to formula (VII) include those wherein $R_f^c$ represents $CF_3CFH—$.

Fluorinated carboxylic acids of formula (VI) are commercially available from Anles Ltd., St. Petersburg, Russia. These compounds may be prepared for example as described by Ershov and Popova in Fluorine Notes 4(11), 2002. Also, these fluorinated carboxylic acids typically form as byproducts in the manufacturing of hexafluoropropylene oxide by direct oxidation of hexafluoropropylene.

Fluorinated carboxylic acids according to formula (VII) can be derived from reactants that are also used in the manufacturing of fluorinated vinyl ethers as described in U.S. Pat. No. 6,255,536.

In another embodiment acid fluorides of formula (VIII) are reacted with a metal fluoride like KF or CsF:

$$R_f^g—COF \qquad (VIII)$$

wherein $R_f^g$ is a linear partially or perfluorinated linear aliphatic chain optionally interrupted with one or more oxygen atoms. This reaction results in an alkoxylate that can be further reacted with a carboxylic acid derivative of formula (IX)

$$Y—(CH_2)_n\text{-Q} \qquad (IX)$$

wherein Y represents a leaving group like iodide, bromide, chloride, mesylate, tosylate and the like, n is an integer from 1 to 3, and Q represents a carboxyl acid group or a lower alkyl ester. The reaction results in fluorinated carboxylic acid derivatives of formula (X)

$$R_f^g\text{—}CF_2\text{—}O\text{—}(CH_2)_n Q \qquad (X)$$

with $R_f^g$, n, and Q having the same meaning as above. The corresponding salts can be obtained by saponification.

In yet a further embodiment the fluorinated carboxylic acids correspond to formula (XI)

$$CF_3\text{—}CF_2\text{—}O\text{—}R_f^h\text{—}COOX \qquad (XI)$$

with $R_f^h$ representing a linear partially or fully fluorinated linear carbon chain of 1 to 6 carbon, for example 1, 2, 3 or 4 carbon atoms and X is a monovalent cation. Compounds of this formula can be made by conversion of diacid difluorides of formula (XII) in the presence of e.g. antimony pentafluoride.

$$FOC\text{—}CF(CF_3)\text{—}O\text{—}R_f^h\text{—}COF \qquad (XII)$$

This conversion may be carried out at elevated temperature according to the method described in U.S. Pat. No. 3,555,100 resulting preferably in the decarbonylation of the secondary COF group. The resulting mono acid fluoride can be converted to the corresponding salt using well known methods.

Fluorinated carboxylic acids having a —O—CF$_2$—COOX group can be obtained from the corresponding vinyl ethers —O—CF═CF$_2$. Reaction of the vinyl ether with oxygen according to U.S. Pat. No. 4,987,254 results in acid fluorides carrying a —O—CF$_2$COF group which can be readily converted to the corresponding acid or salt.

Specific examples of fluorinated carboxylic acids that can be used in the method of this invention include the following:

R$_f$—O—CHF—COOH
C$_3$F$_7$—O—CHF—COOH
CF$_3$—O—CF$_2$CF$_2$—CF$_2$—O—CHF—COOH
CF$_3$CF$_2$CF$_2$—O—CF$_2$CF$_2$—CF$_2$—O—CHF—COOH
CF$_3$—O—CF$_2$—CF$_2$—O—CHF—COOH
CF$_3$—O—CF$_2$—O—CF$_2$—CF$_2$—O—CHF—COOH
CF$_3$—(O—CF$_2$)$_2$—O—CF$_2$—CF$_2$—O—CHF—COOH
CF$_3$—(O—CF$_2$)$_3$—O—CF$_2$—CF$_2$—O—CHF—COOH
R$_f$—O—CHF—CF$_2$—COOH
CF$_3$—O—CHF—CF$_2$—COOH
CF$_3$—O—CF$_2$—CF$_2$—O—CHF—CF$_2$—COOH
CF$_3$—CF$_2$—O—CHF—CF$_2$—COOH
CF$_3$—O—CF$_2$—CF$_2$—CF$_2$—O—CHF—CF$_2$—COOH
CF$_3$—O—CF$_2$—O—CF$_2$—CF$_2$—O—CHF—CF$_2$—COOH
CF$_3$—(O—CF$_2$)$_2$—O—CF$_2$—CF$_2$—O—CHF—CF$_2$—COOH
CF$_3$—(O—CF$_2$)$_3$—O—CF$_2$—CF$_2$—O—CHF—CF$_2$—COOH
R$_f$—O—CF$_2$—CHFCOOH
CF$_3$—O—CF$_2$—CHF—COOH
C$_3$F$_7$—O—CF$_2$—CHF—COOH
CF$_3$—O—CF$_2$—CF$_2$—CF$_2$—O—CHF—COOH
CF$_3$—O—CF$_2$—O—CF$_2$—CF$_2$—O—CF$_2$—CHF—COOH
CF$_3$—(O—CF$_2$)$_2$—O—CF$_2$—CF$_2$—O—CF$_2$—CHF—COOH
CF$_3$—(O—CF$_2$)$_3$—O—CF$_2$—CF$_2$—O—CF$_2$—CHF—COOH
R$_f$—O—CF$_2$—CHF—CF$_2$COOH
CF$_3$—O—CF$_2$—CHF—CF$_2$—COOH
C$_2$F$_5$—O—CF$_2$—CHF—CF$_2$—COOH
C$_3$F$_7$—O—CF$_2$—CHF—CF$_2$—COOH
CF$_3$—O—CF$_2$—CF$_2$—CF$_2$—O—CF$_2$—CHF—CF$_2$—COOH
CF$_3$—O—CF$_2$—O—CF$_2$—CF$_2$—O—CF$_2$—CHF—CF$_2$—COOH
CF$_3$—(O—CF$_2$)$_2$—O—CF$_2$—CF$_2$—O—CF$_2$—CHF—CF$_2$—COOH
CF$_3$—(O—CF$_2$)$_3$—O—CF$_2$—CF$_2$—O—CF$_2$—CHF—CF$_2$—COOH
R$_f$—(O)$_m$—CHF—CF$_2$—O—(CH$_2$)$_n$—COOH n=1,2 or 3; m=0 or 1
CF$_3$—O—CHF—CF$_2$—O—CH$_2$—COOH
CF$_3$—O—CF$_2$—CF$_2$—CF$_2$—O—CHF—CF$_2$—O—CH$_2$—COOH
C$_3$F$_7$—O—CHF—CF$_2$—O—CH$_2$—COOH
C$_3$F$_7$—O—CHF—CF$_2$—O—CH$_2$—CH$_2$—COOH
C$_3$F$_7$—O—CF$_2$—CF$_2$—O—CHF—CF$_2$—OCH$_2$COOH
C$_3$F$_7$—O—CF$_2$—CF$_2$—CF$_2$—O—CHF—CF$_2$—OCH$_2$COOH
C$_3$F$_7$—O—CF$_2$—CHF—CF$_2$—OCH$_2$COOH
CF$_3$—CHF—CF$_2$—O—CH$_2$COOH
C$_3$F$_7$—CF$_2$—CHF—CF$_2$—OCH$_2$—COOH
CF$_3$—O—CF$_2$—CF$_2$—O—CH$_2$—COOH
CF$_3$—O—CF$_2$—CF$_2$—CF$_2$—O—CF$_2$—CF$_2$—O—CH$_2$—COOH
C$_3$F$_7$—O—CF$_2$—CF$_2$—O—CH$_2$—COOH
C$_3$F$_7$—O—CF$_2$—CF$_2$—O—CH$_2$—CH$_2$—COOH
C$_3$F$_7$—O—CF$_2$—CF$_2$—O—CF$_2$—CF$_2$—OCH$_2$COOH
C$_3$F$_7$—O—CF$_2$—CF$_2$—CF$_2$—O—CF$_2$—CF$_2$—OCH$_2$COOH
C$_3$F$_7$—O—CF$_2$—CF$_2$—CF$_2$—OCH$_2$COOH
C$_4$F$_9$—O—CH$_2$—COOH
C$_4$F$_9$—O—CH$_2$—CH$_2$—COOH
C$_3$F$_7$—O—CH$_2$COOH
C$_6$F$_{13}$—OCH$_2$—COOH
R$_f$—O—CF$_2$—CF$_2$—COOH
CF$_3$—O—CF$_2$—CF$_2$—COOH
C$_2$F$_5$—O—CF$_2$—CF$_2$—COOH
C$_3$F$_7$—O—CF$_2$—CF$_2$—COOH
C$_4$F$_9$—O—CF$_2$—CF$_2$—COOH
R$_f$—(O—CF$_2$—CF$_2$)$_s$—O—CF$_2$—COOH with s being 1, 2 or 3
CF$_3$—(O—CF$_2$—CF$_2$)$_1$—O—CF$_2$—COOH
C$_2$F$_5$—(O—CF$_2$—CF$_2$)$_1$—O—CF$_2$—COOH
C$_2$F$_5$—(O—CF$_2$—CF$_2$)$_2$—O—CF$_2$—COOH
CF$_3$—(O—CF$_2$—CF$_2$)$_2$—O—CF$_2$—COOH
R$_f$—(O—CF$_2$)$_u$—O—CF$_2$—COOH with u being an integer of 1, 2, 3, 4 or 5
CF$_3$—(O—CF$_2$)$_3$—O—CF$_2$—COOH
CF$_3$—(O—CF$_2$)$_2$—O—CF$_2$—COOH
CF$_3$—(O—CF$_2$)$_1$—O—CF$_2$—COOH
R$_f$—O—CF$_2$—COOH
CF$_3$—O—CF$_2$—CF$_2$—CF$_2$—O—CF$_2$—COOH
CF$_3$—CHF—O—(CF$_2$)$_o$—COOH with o being an integer of 1, 2, 3, 4, 5 or 6
CF$_3$CFH—O—(CF$_2$)$_3$—COOH
CF$_3$CFH—O—(CF$_2$)$_5$—COOH
CF$_3$—CF$_2$—O—(CF$_2$)$_o$—COOH with o being as above
CF$_3$—CF$_2$—O—(CF$_2$)$_3$COOH
CF$_3$—CF$_2$—O—(CF$_2$)$_5$COOH In the above generic formulas, R$_f$ has one of the meanings of PF$^1$, PF$^2$ and PF$^3$ as defined above in respect of generic formula (I), (II) or (III). It is understood that while the above list of compounds only lists the acids, the corresponding salts, in particular the NH$_4^+$, potassium, sodium or lithium salts can equally be used.

Adsorbent Particles

In accordance with the method of the invention, the aqueous liquid is contacted with adsorbent particles. By the term 'adsorbent particles' in connection with the present invention is meant particles that are capable of physically adsorbing the fluorinated surfactant by whatever mechanism of physical adsorption including but not limited to ionic interactions causing physical adsorption. Accordingly, the term 'adsorbent particles' include ion exchange resins, which typically bind fluorinated surfactants having ionic groups as a result of an ion exchange process although the adsorption to the exchange resin may also occur by a physical adsorption process other than the ion exchange process.

Suitable adsorbent particles include activated carbon, silica gel, clays and zeolites as disclosed in U.S. Pub. No. 2005/000904 or WO 05/082785. Conveniently used are activated carbon particles. The shape of the adsorbent particles is not particularly critical. For example, the adsorbent particles may have a plate shape, can be spherical, cylindrical or they can be rods. Also, adsorbent particles having a variety of different shapes may be used as a mixture. The size of the adsorbent particles is typically between 0.05 mm and 20 mm, generally between 0.1 and 10 mm. A practical range is between 0.5 and 5 mm. The adsorbent particles typically adsorb the fluorinated acid surfactant on their surface and it will thus generally be preferred to optimize the specific surface area of the particles, i.e. the amount of surface per unit of weight. Typically, the specific surface area of the adsorbent particles will be between 10 and 5000 $m^2/g$, generally between 100 and 3000 $m^2/g$ with a practical range being from 300 to 2000 $m^2/g$.

Additionally, anion exchange resin particles can be used as adsorbent particles. Examples of anion exchange resin that can be used to adsorb a fluorinated carboxylic acid include strong, medium strong as well as weak basic anion exchange resins. The terms strong, medium strong and weak basic anion exchange resin are defined in "Encyclopedia of Polymer Science and Engineering", John Wiley & Sons, 1985, Volume 8, page 347 and "Kirk-Othmer", John Wiley & Sons, $3^{rd}$ edition, Volume 13, page 687. Strong basic anion exchange resin typically contain quaternary ammonium groups, medium strong resins usually have tertiary amine groups and weak basic resins usually have secondary amines as the anion exchange functions. Examples of anion exchange resins that are commercially available for use in this invention include AMBERLITE® IRA-402, AMBERJET® 4200, AMBERLITE® IRA-67 and AMBERLITE® IRA-92 all available from Rohm & Haas, PUROLITE® A845 (Purolite GmbH) and LEWATIT® MP-500 (Bayer AG).

The amount of adsorbent particles used to remove the fluorinated carboxylic acids for the aqueous liquid will generally depend on the nature of the adsorbent particles used as well as on the composition of the waste water, in particular the amount of fluorinated surfactant contained therein. Suitable amounts of the adsorbent particles may be determined by one skilled in the art through routine experimentation. Further, the aqueous liquid may be contacted with the adsorbent particles in any suitable way, including contacting in a stationary bed such as for example where the liquid is guided through one or more columns filled with adsorbent particles or in a non-fixed bed where the aqueous liquid is stirred with the adsorbent particles for a suitable amount of time. A stationary or fixed bed is usually most practical.

Typical values for the contact time are less than 10 hours, preferably less than 5 hours for non fixed bed adsorption processes. For fixed bed processes the typical flow rates are from 0.1 bed volumes/hour to 10 bed volumes/hour, preferred flow rates are between 1 and 5 bed volumes/hour.

Aqueous Liquid

The aqueous liquid can be any aqueous liquid containing the fluorinated carboxylic acid or acids of any of formulas (I) to (III) including any mixtures thereof. Generally the aqueous liquid is a waste water, for example any waste water that may be produced in a fluoropolymer plant. Such waste waters typically contain the fluorinated carboxylic acid(s) in amount of not more than 5% by weight, for example not more than 3% by weight. In a particular embodiment, the amount of fluorinated carboxylic acid in the waste water is not more than 1% by weight with a typical embodiment including waste water having an amount of fluorinated carboxylic acid between 10 ppm and 5000 ppm, for example between 50 ppm and 3000 ppm.

The pH of the aqueous liquid is preferably adjusted in such a way to ensure the most effective removal rate. Typically the pH is in the range of 2 to 12, preferably between 4 and 10.

In one particular embodiment, the waste water may be a scrubbing liquid resulting from scrubbing exhaust gas generated in the drying of fluoropolymer. When, after polymerization, a fluoropolymer is isolated from an aqueous medium, i.e., by coagulation in dispersion polymerization, a substantial portion of the fluorinated carboxylic acid typically remains in the fluoropolymer. When the fluoropolymer is heated for the purpose of drying, the fluorinated carboxylic acid is volatilized and carried away in the dryer or oven exhaust gas. To avoid release of the fluorinated carboxylic acid into the environment, the exhaust gas with a scrubber solution or liquid to recover the fluorinated carboxylic acid from the exhaust gas stream, also called off-gas stream. Hence, the scrubber solution will contain the fluorinated carboxylic acid, which can be recovered there from using the method of the present invention.

Also, during coagulation, part of the fluorinated carboxylic acid may stay in the aqueous phase. Similarly, during upconcentration of a fluoropolymer dispersion, fluorinated carboxylic acid is removed together with water. These waste water streams generally not only include fluorinated carboxylic acid but will generally also contain a small amount of fluoropolymer particles. The quantity of fluoropolymer particles in the waste water is generally limited and is typically less than 5% by weight or less than 3% by weight based on the amount of water. A common amount of fluoropolymer particles in the waste water is less than 1% by weight, e.g. between 0.01 and 0.5% by weight. The fluoropolymer particles may have any shape although they are generally spherical and they may vary widely in size. Typically the fluoropolymer particles will have a diameter between 10 nm and 1000 nm, commonly between 30 and 500 nm.

To avoid that the presence of such fluoropolymer particles would interfere with the adsorption of the fluorinated carboxylic acid, in particular to avoid that the fluoropolymer particles block the adsorbent particles in an early stage of the process, thus rendering the process less economical and practical, a stabilizing surfactant is preferably added to the waste water. The stabilizing surfactant is typically a non-fluorinated surfactant and depending on the nature of the adsorbent particles used, such stabilizing surfactant may be a non-ionic or anionic surfactant. Generally, a non-ionic surfactant will be used since such a surfactant can be used with any type of adsorbent particle. An anionic surfactant may be used with most adsorbent particles but is normally not useful and effective when the adsorbent particles comprise an anion exchange resin due to the fact that the anionic surfactant will typically also bind rapidly to the anion exchange resin such that the anionic surfactant may not be effectively stabilize the fluoropolymer particles in the waste water during recovery of the fluorinated carboxylic acid.

The amount of the stabilizing surfactant needed will typically depend on the nature of the adsorbent particles used as well as on the amount of fluoropolymer particles in the waste water. The appropriate amount can be readily determined by one skilled in the art through routine experimentation. Generally, the amount of stabilizing surfactant will be between 0.0001 and 1% by weight based on the waste water. A convenient amount is between 0.003 and 0.03% by weight.

Examples of suitable non-ionic non-fluorinated surfactants include surfactants that contain one or more saturated or unsaturated aliphatic moieties linked to one or more non-ionic hydrophilic groups. The saturated or unsaturated aliphatic moieties may include linear, branched and/or cyclic structures and they can be linked to the non-ionic hydrophilic group through a functional group such as an ester, ether linkage, amide linkage etc. The non-ionic hydrophilic group generally comprises oxyalkylene groups in which the alkylene group has 2, 3 or 4 carbon atoms. For example, the non-ionic hydrophilic group may be a polyoxyethylene group, a polyoxypropylene group or a copolymer, including block-copolymers, comprising oxyethylene and oxypropylene groups.

Particular examples of non-ionic surfactants include polyoxyalkylene alkyl ether surfactants, polysorbates and alkoxylated acetylenic diols, preferably ethoxylated acetylenic diols. Commercially available ethoxylated acetylenic diols that may be used include those available under the SURFYNOL™ brand from Air Products, in particular SURFYNOL™ 465.

According to a particular embodiment in connection with the present invention, the non-ionic surfactant corresponds to the formula:

$$R^1—O—[CH_2CH_2O]_n—[R^2O]_m—R^3 \quad (E)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2.

It will be understood that in the above formula (E), the units indexed by n and m may appear as blocks or they may be present in an alternating or random configuration.

Examples of non-ionic surfactants according to formula (E) above include alkylphenol oxy ethylates of the formula:

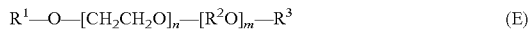

(F)

wherein R is an alkyl group of 4 to 20 carbon atoms and r represents a value of 4 to 20. Examples of surfactants according to formula (F) include ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8.

Still further examples include those in which $R^1$ in the above formula (E) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X 080 from Clariant GmbH. Non-ionic surfactants according to formula (E) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Polystep™ A16 (sodium dodecylbenzyl sulphonate) from Stepan Company, Hostapur™ SAS 30 (secondary alkyl sulphonate sodium salt), Emulsogen™ LS (sodium lauryl sulfate) and Emulsogen™ EPA 1954 (mixture of $C_{12}$ to $C_{14}$ sodium alkyl sulfates) available from Clariant GmbH and TRITON™ X-200 (sodium alkylsulfonate) available from Union Carbide. Preferred are anionic hydrocarbon surfactants having a sulfonate group.

In an alternative embodiment, fluoropolymer particles and/or fine solids contained in the waste water are removed prior to contacting the waste water with the adsorbent particles. Methods for removing the fluoropolymer particles have been disclosed in U.S. Pat. No. 6,613,941 and include precipitation followed by separating the precipitate from the waste water as well as mechanical methods. Generally, the method of removing the fluoropolymer particles and other fine solids depends on the particular circumstances.

In the case of acidic wastewater, it can be sufficient to carry out a, possibly partial, neutralization with suitable bases such as calcium hydroxide, resulting in precipitation of the colloid particles while the fluorinated carboxylic acid or its salt remain in solution.

Another possible way of precipitating the interfering fluoropolymer particles is the addition of suitable metal salts, for example aluminum salts such as aluminum chloride and aluminum sulfate, calcium salts such as calcium chloride, magnesium salts such as magnesium chloride and magnesium sulfate, iron salts such as iron(II) chloride or iron(III) chloride and iron sulfate. In the case of acidic wastewater, the addition of corresponding metals such as aluminum, iron or magnesium is also possible. To improve the flocculation, small amounts of a flocculant can also be added e.g. polyelectrolytes such as Magnafloc® (Ciba-Geigy).

A further possible way of precipitating the interfering colloids is electrocoagulation. Here, an electric field is applied to the wastewater to coagulate the colloidal particles. In the case of inert electrodes (for example titanium), the particles deposit on the surfaces. In the case of soluble electrodes (for example iron and/or aluminum), metal cations having a high charge: diameter ratio are introduced into the solution and these effect coagulation as in the case of addition of metal salts. An advantage of electrocoagulation is that it avoids the additional introduction of anions such as chloride or sulfate. To improve flocculation, small amounts of a flocculant can be added.

The precipitated solids can be separated off in a manner known per se, for example by filtration, if necessary using a filter aid, by decantation, by flotation or sedimentation.

Suitable mechanical methods of removing the fine solids, i.e. fluoropolymer particles are crossflow filtration (for example using membranes, centrifuges), deep bed filtration (for example sand bed filters) or precoat filtration with addition of a filter aid (for example cellulose, perlite, kieselgur).

Along with the removal of fluorinated carboxylic acids according to the present invention, any other surface active agents generated during the polymerization process may be removed as well.

EXAMPLES

Test Method
Content of Fluorinated Carboxylic Acid
The amount of fluorinated carboxylic acid in aqueous solution was determined by conversion of the fluorinated emulsifier into the methyl ester followed by an analysis with gas chromatography (head space) using methyl ester of perfluorodecanoic acid as an internal standard. The detection limit was about 10 ppm.

Particle Size
The latex particle size determination was conducted by means of dynamic light scattering with a Malvern Zetazizer 1000 HAS in accordance to ISO/DIS 13321. Prior to the measurements, the polymer latexes as yielded from the polymerizations were diluted with 0.001 mol/L KCl-solution, the measurement temperature was 25° C. in all cases. The reported average is the Z-average particle diameter.

SSG: Standard specific gravity was measured according ASTM 4894-04

Solid Content: Determination of solid content was done by subjecting the latex sample to a temperature up to 250° C. for 30 min.

Polymerization of Fluorinated Monomers (Fluoroolefin) Using a Fluorinated Carboxylic Acid The polymerization experiments were performed in a 40 l kettle equipped with an impeller agitator and a baffle. The kettle was charged with 30 l of deionized water and set to 35° C.; the kettle was evacuated repeatedly to remove oxygen; Agitation speed was set to 165 rpm. The oxygen free kettle was charged with 70 mmol fluorinated emulsifier (unless specified differently) as listed in table 3 and the following materials were added: 0.5 ml of a solution containing 40 mg of copper sulphate penta hydrate and 1 mg of conc. sulphuric acid; 15 g of a 25 w-% of aqueous ammonia solution and 5.6 g of $CF_3CF_2CF_2$—O—$CF(CF_3)$—$CF_2$—O—CF=$CF_2$ (PPVE-2). Finally the reactor was pressurized with tetrafluoroethylene (TFE) to 0.2 MPa and 47 g of hexafluoropropylene (HFP) were added. The kettle was then set to 1.5 MPa using TFE and 100 ml of an aqueous initiator solution containing 140 mg of sodium disulfite followed by 100 ml of a solution containing 340 mg of ammonium peroxodisulfate was pumped into the reactor. The beginning of the polymerization is indicated by a pressure drop. During polymerization the pressure was maintained at 1.5 MPa by feeding TFE continuously. After 3.2 kg of TFE had been added, the monomer valve was closed and the pressure was released. The characteristics of the obtained polymer latices are summarized in table 3.

1000 ml of this polymer dispersion were coagulated by adding 20 ml hydrochloric acid under agitation. The coagulated material was agglomerated with gasoline and washed repeatedly. The agglomerated polymer was dried overnight at 200° C. in a vacuum oven; test data are given in table 3.

TABLE 1

| Emulsifiers used: | |
|---|---|
| $C_7F_{15}COONH_4$ | Comparative example C-1 |
| $CF_3$—O—$(CF_2)_3$—O—CF(CF_3)—$COONH_4$ | Comparative example C-2 |
| $C_3F_7$—O—CF(CF_3)—$CF_2$—O—$CF_2$—$COONH_4$ | Comparative example C-3 |
| $CF_3$—O—$(CF_2)_3$—O—$CF_2$—$COONH_4$ | Compound 1 |
| $CF_3$—$OCF_2$—O—$CF_2$—$COONH_4$ | Compound 2 |
| $CF_3$—$OCF_2$—$OCF_2$—$OCF_2$—$COONH_4$ | Compound 3 |
| $CF_3$—$(OCF_2)_3$—$OCF_2$—$COONH_4$ | Compound 4 |
| $CF_3$—O—$CF_2$—$CF_2$—$COONH_4$ | Compound 6 |
| $C_2F_5$—O—$CF_2$—$CF_2$—$COONH_4$ | Compound 7 |
| $C_3F_7$—O—$CF_2$—$CF_2$—$COONH_4$ | Compound 8 |
| $C_4F_9$—O—$CF_2$—$CF_2$—$COONH_4$ | Compound 9 |
| $CF_3$—O—$CF_2$—$CF_2$—$CF_2$—O—CHF—$CF_2$—$COONH_4$ | Compound 11 |
| $CF_3$—O—$CF_2$—$CF_2$—$CF_2$—O—CHF—$COONH_4$ | Compound 12 |
| $C_3F_7$—O—CFH—$CF_2COONH_4$ | Compound 13 |
| $CF_3$—CFH—O—$(CF_2)_5$—$COONH_4$ | Compound 14 |
| $CF_3$—CFH—O—$(CF_2)_3$—$COONH_4$ | Compound 15 |
| $C_3F_7$—O—CFH—$CF_2$—O—$CH_2$—$COONH_4$ | Compound 16 |
| $C_3F_7$—O—CFH—$COONH_4$ | Compound 17 |

Preparation of Compound 1: $CF_3OCF_2CF_2CF_2OCF_2COONH_4$

Oxidation of perfluorinated vinyl ethers with oxygen in the presence of $SbF_5$ was carried out as described in U.S. Pat. No. 4,987,254. The initially formed acid fluorides were esterified with methanol and purified by distillation. The distilled esters were converted to the corresponding ammonium salts by saponification with aqueous ammonia. A dry flask equipped with a magnetic stirrer bar, thermometer, dry ice reflux condenser, dropping funnel, and gas inlet tube was charged with 5 g of graphite. The flask was flushed with nitrogen and 332 g of $CF_3OCF_2CF_2CF_2OCF=CF_2$ were added at room temperature. 2.6 g of $SbF_5$ was added via the dropping funnel and oxygen was charged to the flask at ambient pressure. An exothermic reaction indicated the oxidation. Total reaction time was 14 h. After the first hour 2.6 g and after 7 hours 3.5 g of $SbF_5$ were added. Esterification was achieved by slow addition of 50 g of methanol to the reaction mixture. The resulting ester was isolated from the batch by flash distillation after addition of 300 g water and 50 g methanol. The distillate formed two phases. The lower phase was separated and the upper phase retuned to the flask. 310 g of lower phase were collected. GC analysis showed a content of 52% of $CF_3OCF_2CF_2CF_2OCF_2COOCH_3$. Purification via fractionated distillation resulted in 144 g pure ester with a boiling point of 51° C. at 52 mbar. $CF_3OCF_2CF_2COOCH_3$ was isolated as by product. Saponification of the ester with aqueous ammonia at 60-80° C. and removal of methanol by distillation resulted in an aqueous solution of $CF_3OCF_2CF_2CF_2OCF_2COONH_4$. All structures were confirmed by F-NMR spectra.

Preparation of Compound 17: $CF_3CF_2CF_2OCHFCOONH_4$

A 2 liter glass flask equipped with a mechanical stirrer, thermometer and reflux condenser (−80° C.) is used. Heating of the flask is provided by an electric heating mantle. The conversion is carried out as a one pot reaction. 275 g perfluoropropyl vinyl ether (PPVE), 280 g KOH, 602 g water, 151 g t-butanol, and 10 g methyl trioctyl ammonium chloride are placed in the flask. The three phase mixture is subjected to vigorous stirring. After initial heating a moderate exothermic reaction occurs. Mixing is continued for nine hours. During this time the internal temperature adjusts to 27-33° C. Mixing is stopped when the exothermic reaction ceases. The reaction mixture forms two layers. The low temperature reflux condenser is replaced by a standard reflux condenser. Sulfuric acid (392 g) is slowly added without external cooling. The batch is heated to reflux. Unreacted PPVE is vented. At about 80° C. internal temperature gas begins to evolve. Heating is continued until the gas evolution has ceased. At this time the internal temperature reaches 101° C. The batch is cooled to RT and the reflux condenser is replaced by a distillation device. No column is used. 110 g methanol is added to the batch and distillation is started. The condensed vapors form two layers. The lower layer is separated and the upper layer is returned to the flask. Distillation is stopped when no more lower phase is formed. In total, 234 g of lower phase are collected. Fractionation of the lower phase yields 167 g of $C_3F_7OCHFCOOCH_3$ with a boiling point of 120-122° C. at ambient pressure.

Calculated yield: 59% based on total PPVE used; 70% based on converted PPVE.

The ester is converted to the ammonium salt by reaction with aqueous ammonia. Methanol is removed by fractionated distillation. The resulting aqueous solution is used as an emulsifier in the polymerization of fluorinated olefins.

Preparation of Compound 12: $CF_3OCF_2CF_2CF_2OCHFCOONH_4$

A glass flask equipped with a reflux condenser, thermometer, and magnetic stirrer was used. Perfluoromethoxy propyl vinyl ether (498 g), t-butanol (149 g), water (1007 g), potassium hydroxide (280 g), and methyl trioctyl ammonium chloride (10 g) were added to the flask. The resulting two phase mixture was heated to reflux for 16 hours under vigorous stirring. The mixture was cooled to room temperature and sulphuric acid (588 g) was added. The two phase mixture was heated again under vigorous stirring. At about 70° C. gas began to evolve. Heating was continued until the gas evolution ceased. The reflux condenser was replaced by a distillation device which allowed the separation of a lower phase while returning the upper phase to the flask. Methanol (150 g) was added and the mixture was heated for distillation. Distillation was carried out at ambient pressure without any intent for rectification. The condensed vapors separated into two phases. The lower phase was collected and the upper phase was returned to the flask. Distillation was continued until no more lower phase separated from the condensate. The combined crude ester (493 g) was purified by fractionated distillation, resulting in 401 g $CF_3O(CF_2)_3OCHFCOOCH_3$ with a boiling point of 51 to 52° C./22 mbar. This corresponds to a yield of 78%, based on vinyl ether used. The ester was converted to the ammonium salt by heating with aqueous ammonia and removal of methanol by fractionated distillation.

Alternatively, the previous reaction was repeated but 36 g of an aqueous solution containing 11 g of $CF_3O(CF_2)_3OCHFCOONH_4$ was used as phase transfer catalyst instead of methyl trioctyl ammonium chloride. The mixture was slowly heated to 70° C. internal temperature. Total reaction time was 26 hours. Work up was carried out as described above. 438 g of distilled $CF_3O(CF_2)_3OCHFCOOCH_3$ was received. This corresponds to a yield of 83% (calculation includes the amount of phase transfer catalyst). The conversion to the ammonium salt was carried out as above.

Preparation of Compound 13: $C_3F_7OCHFCF_2COONH_4$
a. Preparation of $CF_3CF_2CF_2OCHFCF_2CH_2OH$ In a 2 liter glass flask equipped with a stirrer, thermometer, reflux condenser, and dropping funnel were placed 1008 g methanol, 266 g perfluoropropyl vinyl ether, and 9.2 g of Rongalit® (sodium hydroxymethyl sulfinate). The reaction mixture was heated to reflux, resulting in an internal temperature of 29° C. 7.1 g t-butyl hydroperoxide (70% in water) is added in aliquots during a 9 h time frame. The internal temperature reached 52° C. at the end. The reaction mixture showed a single liquid phase and some solids. The liquid was analyzed by GC and indicated a content of 223 g of $C_3F_7OCHFCF_2CH_2OH$ which corresponded to a yield of 75%.

Distillation of the reaction mixture resulted in 171 g of product (bp 54° C./23 mbar) corresponding to an isolated yield of 57%.

b. Preparation of $C_3F_7OCHFCF_2COONH_4$

A 2 liter glass flask equipped with a thermometer, reflux condenser, dropping funnel and stirrer was used. 674 g water, 136 g KMnO4, and 38 g NaOH are placed in the flask. 169 g $C_3F_7OCHFCF_2CH_2OH$ were added to the well stirred mixture via the dropping funnel. The temperature is held below 50° C. Residual permanganate was destroyed by addition of a small amount of methanol. The resulting slurry was filtered to remove the $MnO_2$. After washing the filter cake with water, the combined filtrate was transferred to a distillation apparatus and acidified with 65 g of sulfuric acid. 100 g methanol was added and a flash distillation was started. The distillate formed two layers. The lower layer was separated and the upper layer returned to the distillation pot. In total 182 g lower layer were collected. Fractionation of the crude ester resulted in 137 g of $C_3F_7OCHFCF_2COOCH_3$ with a boiling point of 55-56° C./52 mbar. This corresponds to a yield of 77%.

The ester was converted to the ammonium salt by saponification with aqueous ammonia and subsequent removal of methanol by distillation.

Preparation of Compound 11: $CF_3O(CF_2)_3OCHFCF_2COONH_4$ a. Preparation of $CF_3O(CF_2)_3OCHFCF_2CH_2OH$ Using equipment similar to the described above, 255 g of perfluoromethoxypropyl vinyl ether and 730 g methanol were converted with Rongalit and t-butylhydroperoxide as radical source. Reaction temperature started at 47° C. and reached 64° C. at the end. Work up by distillation yielded 166 g of pure $CF_3O(CF_2)_3OCHFCF_2CH_2OH$ with a boiling point of 60-61° C./20 mbar. This corresponds to a yield of 59%.

b. Preparation of $CF_3O(CF_2)_3OCHFCF_2COONH_4$

A 2 liter glass flask equipped with a thermometer, reflux condenser, dropping funnel and stirrer was used. 159 g of $CF_3O(CF_2)_3OCHFCF_2CH_2OH$, 520 g water, and 100 g sulfuric acid were added to the flask. 190 g KMnO4 were added manually to the liquid over a period of 2 hours while stirring. The reaction temperature increased to 95° C. over time. After a post reaction time of two hours, an aqueous solution of sodium bisulfite was added until a clear solution was formed. 100 g of methanol and in total 400 g of 50% aqueous sulphuric acid were added. Flash distillation of the reaction mixture resulted in a two phase distillate. Fractionation of the lower phase (120 g) gave 85.5 g of $CF_3O(CF_2)_3OCHFCF_2COOCH_3$ (bp 34-35° C./6 mbar; yield 50%).

The ester was converted to the ammonium salt by saponification with aqueous ammonia and subsequent removal of methanol by distillation.

Preparation of Compound 6

$CH_3$—O—$CF_2$—$CF_2$—$COOCH_3$ was fluorinated as described in WO 01/46116; the acid fluoride $CF_3$—O—$CF_2$—$CF_2$—COF was then converted into the methylester. The distilled ester was converted into the ammonia-salt as described above.

Preparation of Compound 14: $CF_3$—CFH—O—$(CF_2)_5$COONH$_4$

A sample of diacid fluoride, FCOCF(CF$_3$)—O—(CF$_2$)$_5$COF (500 g, 1.1 mol) prepared from the hexafluoropropylene oxide (HFPO) coupling of perfluoroadipoyl fluoride as described in U.S. Pub. No. 2004/0116742 and was added over 2 hours to a stirred slurry of sodium carbonate (500 g, 4.7 mol) in 500 g of diglyme at 85° C. to make the disalt. The reaction liberated CO$_2$ gas. Distilled water (25 g, 1.4 mol) was added at 85° C. The mixture was heated up to 168° C. with CO$_2$ off-gassing and held for 30 minutes. Reaction was cooled down and sulphuric acid (350 g, 3.6 mol) in 1100 g of water was added to make the reaction mixture acidic. Bottom phase was washed with 400 g of 50% sulfuric acid and vacuum distilled to give CF$_3$—CFH—O—(CF$_2$)$_5$COOH 426 g, 1.0 mol for a 95% yield having a boiling point of 132-135° C./15 mm. This was followed by the addition of 46 g NaOH in 63 g of water. Dried salts in vacuum oven at 112° C./15 mm Hg to give 386 g of slight yellow sticky solids. To the salt was added sulphuric acid and the lower fluorochemical phase was vacuum distilled. The previous process was repeated two more times to yield a colorless acid. The surfactant CF$_3$—CFH—O—(CF$_2$)$_5$COONH$_4$ having a melting point of 159-165° C. was made quantitatively from the reaction of 200 g of acid reacted with excess ammonium hydroxide and dried.

Preparation of Compound 15: CF$_3$—CFH—O(CF$_2$)$_3$COONH$_4$

A sample of diacid fluoride, FCOCF(CF$_3$)—O—(CF$_2$)$_3$COF (503 g, 1.4 mol) prepared from the HFPO coupling of perfluorosuccinyl fluoride as described in U.S. Pub. No. 2004/0116742 and was added over 2 hours to a stirred slurry of sodium carbonate (387 g, 3.7 mol) in 650 g of diglyme at 78° C. to make the disalt. The reaction liberated CO$_2$ gas. Distilled water (35 g, 1.9 mol) was added at 85° C. The mixture was heated up to 165° C. with CO$_2$ off-gassing and held for 30 minutes. Reaction was cooled down and sulphuric acid (250 g, 2.6 mol) in 1250 g of water was added to make the reaction mixture acidic. To the bottom phase was added 60 g NaOH in 60 g of water. Dried the salt in vacuum oven at 112° C./15 mm and recovered 450 g. To the salt was added 300 g of 50% sulphuric acid and the lower fluorochemical phase was washed once with 200 g of 50% sulphuric acid. Vacuum distillation gave CF$_3$—CFH—O—(CF$_2$)$_3$COOH (400 g, 1.3 mol) for a 95% yield having a boiling point of 111° C./15 mm Hg. The acid was treated with caustic followed by sulphuric acid and vacuum distilled. This was repeated a second time to yield a colorless acid. The surfactant CF$_3$—CFH—O—(CF$_2$)$_3$ COONH$_4$ having a melting point of 64-68° C. was made quantitatively from the reaction of 208 g of acid reacted with excess ammonium hydroxide and dried.

Preparation of Compound C-3

Conversion of CF$_3$CF$_2$CF$_2$OCF(CF$_3$)CF$_2$OCF=CF$_2$ to CF$_3$CF$_2$CF$_2$OCF(CF$_3$)CF$_2$OCF$_2$COOCH$_3$ (bp 91-92° C. at 133 mbar) was carried described in U.S. Pat. No. 4,987,254. The ester was reacted with aqueous ammonia and methanol was removed by distillation resulting in CF$_3$CF$_2$CF$_2$OCF (CF$_3$)CF$_2$OCF$_2$COONH$_4$. All structures were confirmed by F-NMR spectra. Due to an isomer content in the vinyl ether, an isomer with the structure CF$_3$CF$_2$CF$_2$OCF$_2$CF(CF$_3$) OCF$_2$COOX (X=CH$_3$, NH$_4$) was found.

Preparation of Compound 16: C$_3$F$_7$—O—C$_2$HF$_3$—O—CH$_2$—COONH$_4$

A mixture of 320 ml Tetrahydrofurane, 40 g Hydroxy acetic methylester and 188 g PPVE is cooled to 0° C., 27 g KOH-powder are added in small portions—during the addition of KOH, the reaction mixture heats up to 60° C. After the addition of KOH, the whole reaction mixture is agitated for 6 h at 25° C. The precipitated salt is separated by filtration, dissolved in 300 ml water and then treated with 57 g H$_2$SO$_4$ (conc). The resulting mixture separates in two layers; the lower phase is C$_3$F$_7$—O—C$_2$HF$_3$—O—CH$_2$—COOH, 86 g (56%). The distilled acid (bp. 125° C., 20 mbar) is neutralized with 25% aqueous ammonia solution to provide a 30% solution in water.

Compounds 2, 3, 4 were prepared from the corresponding carboxylic acids (purchased from Anles Ltd. St. Petersburg, Russia) by neutralizing with aqueous ammonia.

Compounds 7 and 8 were prepared from the corresponding carboxylic acid fluorides (~COF) [purchased from Exfluor, Round Rock, Tex., USA]. The acid fluorides were converted by addition of methanol to the methylester. The distilled methylester were saponified with aqueous ammonia at 60-80° C. and methanol is removed by distillation.

Compound C-2 was prepared as described in U.S. Pat. No. 6,703,520 (column 7).

Determination of Bio-Accumulation

The perfluorinated and partially fluorinated carboxylates were evaluated for urinary clearance using a pharmacokinetic study in rats. The goal was to measure the total amount of parent compound eliminated via urinary output and estimate the rate of elimination. The study was approved by the IACUC (Institutional Animal Care and Use Committees) and was performed in 3M Company's AAALAC (Association for Assessment and Accreditation of Laboratory Animal Care)—accredited facility.

The study utilized male Sprague Dawley rats, 6 to 8 weeks of age, and approximately 200 to 250 g body weight at study onset. The test compounds of table 2 were administered at a dose of 73 micro Moles per kg body weight in rats (N=3 animals per tested compound). All test compounds were prepared in sterile deionized water and given to rats via oral gavage. After test compounds administration, the rats were housed individually in metabolism cages for urine collection: 0 to 6 hours, 6 to 24 hours, 24 to 48 hours and 72 to 96 hours. Animals were observed throughout the study for clinical signs of toxicity. Gross necropsy was performed at the termination of each study (96 hours post-dose) with sera and liver samples being retained from each animal.

The concentration of the parent compound or metabolites thereof were quantitatively measured via fluorine NMR on each urine sample for each animal at each time point based on internally added standards.

The bioaccumulation data obtained in accordance with the above test are reported in table 2 below.

TABLE 2

| | $T^{1/2}$ (h) | % Recovery (96 h) | Compound-related Effects |
|---|---|---|---|
| C-1 | ~550 | 6 | Hepatomegaly |
| C-2 | 29 | 40 | Hepatomegaly |
| C-3 | 95 | 5 | Hepatomegaly |
| Compound 1 | 10 | 73 | — |
| Compound 2 | 12 | 96 | — |
| Compound 3 | 12 | 100 | — |
| Compound 4 | 15 | 50 | — |
| Compound 6 | 11 | 100 | — |
| Compound 7 | 10 | 100 | — |
| Compound 8 | 12 | 82 | — |
| Compound 9 | 31 | 42 | Hepatomegaly |
| Compound 11 | 12 | 84 | — |
| Compound 12 | 11 | 95 | |
| Compound 13 | 11 | 94 | — |
| Compound 14 | 24 | 32 | Hepatomegaly |

TABLE 2-continued

| | T½ (h) | % Recovery (96 h) | Compound-related Effects |
|---|---|---|---|
| Compound 15 | 8 | 95 | — |
| Compound 16 | 13* | 65* | — |

*No parent compound observed in the urine. T½ and % recovery are based on elimination of the major metabolite —C$_3$F$_7$—O—CHFCOO$^-$. T$_{1/2}$ is the renal half-life and is the time required for the amount of a particular substance in a biological system to be reduced to one half of its value by biological processes when the rate of removal is approximately exponential. In these examples the value of T$_{1/2}$ is calculated by exponential least squares curve fitting ($y = Ae^{Bx}$ and T$_{1/2}$ = 0.693/B) where y represents the concentration of analyte in urine and x represents time in hours.

TABLE 3

| | C-1 | C-2 | C-3 | 1 | 2 (140 mmol) | 3 | 4 | 6 |
|---|---|---|---|---|---|---|---|---|
| Polymerization time (min) | 101 | 77 | 87 | 74 | 109 | 69 | 82 | 84 |
| Average Particle Size (nm) | 111 | 118 | 113 | 110 | 129 | 115 | 109 | 122 |
| SSG (g/cm$^3$) | 2.166 | 2.165 | 2.149 | 2.169 | 2.157 | 2.165 | 2.163 | 2.175 |
| Solid content (w-%) | 9.9 | 10.0 | 10.3 | 10.3 | 9.7 | 10.1 | 10.2 | 7.1 |

| | 7 (140 mmol) | 8 | 9 | 11 | 12 | 13 | 14 (140 mmol) | 15 |
|---|---|---|---|---|---|---|---|---|
| Polymerization time (min) | 73 | 79 | 72 | 82 | 82 | 83 | 75 | 78 |
| Average Particle Size (nm) | 129 | 115 | 113 | 126 | 108 | 128 | 127 | 105 |
| SSG (g/cm$^3$) | 2.159 | 2.167 | 2.165 | 2.168 | 2.167 | 2.164 | 2.151 | 2.154 |
| Solid content (w-%) | 10.1 | 10.0 | 10.2 | 10.2 | 10.3 | 10.2 | 8.1 | 10. |

Recovery of Fluorinated Ether Carboxylic Acids from Aqueous Phase

Waste water was received from work up of fluorinated polymer dispersions comprising the majority of the fluorinated emulsifier employed in the polymerization process. The waste water was not diluted with washing water from the agglomerated product. Waste water from the polymerization of a fluoropolymer containing about 0.28% by weight of polymer latex particles, 800 ppm of fluorinated emulsifier ammonium 2,4,6 trioxa-perfluoro-octanoate (CF$_3$—(OCF$_2$)$_3$—COONH$_4$) and small amounts of agglomeration aid like gasoline was employed. 100 ppm of Genapol X080 were added and the waste water was set to pH =8.0 using NaOH.

An anion exchange column filled with 300 ml of Amberlite IRA 402 Cl (a strong basic anion exchanger from Rohm & Haas with a capacity of 1.3 mol/l) was brought into OH form by treating with 12 Bed Volumes (BV) of NaOH (4% in water) flow rate 3 BV/h (1 BV is equal to 300 ml). The resin was then washed with 10 BV deionized water and 3 BV Genapol X080 (0.5% in water).

The flow direction of the waste water through the column was from bottom to top and the flow rate about 1 BV/h. After different amounts of waste water had passed through the ion exchange column (see table 4) a sample was taken. The residual amount of fluorinated emulsifier in the waste water was determined by conversion of the fluorinated emulsifier into the methyl ester followed by an analysis with gas chromatography (head space) using methyl ester of perfluorodecanoic acid as an internal standard. The detection limit was about 10 ppm. No clogging of the column was observed and the amount of polymer latex particles leaving the column remained unchanged.

TABLE 4

| Sample | amount of waste water passed through column (BV) | residual fluorinated emulsifier content in waste water (ppm) |
|---|---|---|
| 1 | 24 | <10 ppm |

TABLE 4-continued

| Sample | amount of waste water passed through column (BV) | residual fluorinated emulsifier content in waste water (ppm) |
|---|---|---|
| 2 | 96 | <10 ppm |
| 3 | 144 | <10 ppm |
| 4 | 192 | <10 ppm |

What is claimed is:

1. Method of removing a fluorinated carboxylic acid or salt thereof from an aqueous liquid by contacting the aqueous liquid with adsorbent particles, wherein said fluorinated carboxylic acid or salt thereof is selected from the group consisting of (i) partially fluorinated carboxylic acids or salts thereof corresponding to the general formula:

$$[PF^1\text{—O-}L^1\text{-COO}^-]_iX^{i+} \quad (I)$$

wherein PF$^1$ represents a linear partially or fully fluorinated aliphatic group or a linear partially or fully fluorinated aliphatic group interrupted with one or more oxygen atoms, L$^1$ represents a linear partially fluorinated aliphatic hydrocarbon group, X$^{i+}$ represents a cation having the valence i and i is 1, 2 or 3; and (ii) fully fluorinated carboxylic acids or salts thereof corresponding to one of the following general formulas:

$$[PF^2\text{—O—}(CF_2)_p\text{—COO}^-]_iX^{i+} \quad (II)$$

wherein PF² represents a linear fully fluorinated aliphatic group or a linear fully fluorinated aliphatic group interrupted with one or more oxygen atoms, p is an integer of 2 to 6 and $X^{i+}$ and i have the same meaning as in formula (I), wherein the anion of said fluorinated carboxylic acids or salts thereof has a molecular weight of not more than 1000 g/mol.

2. Method according to claim 1 wherein said aqueous liquid comprises waste water having said fluorinated carboxylic acid or salt thereof in an amount of not more than 5% by weight.

3. Method according to claim 1 wherein said aqueous liquid comprises waste water from the production of a fluoropolymer, said waste water further comprising fluoropolymer particles.

4. Method according to claim 3 wherein the amount of fluoropolymer particles is not more than 3% by weight.

5. Method according to claim 3 wherein said waste water is contacted with said adsorbent particles in the presence of an anionic or non-ionic surfactant.

6. Method according to claim 3 wherein the fluoropolymer particles are removed from the waste water prior to contacting the waste water with said adsorbent particles.

7. Method according to claim 1 wherein the adsorbent particles are selected from anion exchange resins and activated carbon particles.

8. A method according to claim 1 wherein the anion of said fluorinated carboxylic acids or salts thereof has a molecular weight of not more than 500 g/mol.

9. A method according to claim 1 wherein the fluorinated carboxylic acid or salt thereof when administered to rat shows a renal recovery rate of at least 50% of the administered amount, 96 hours after administration and wherein the renal half-life ($T_{1/2}$) is not more than 30 hours.

10. A method according to claim 1 wherein the fluorinated carboxylic acid or salts are selected from fluorinated carboxylic acid or salts of which any fluorinated aliphatic portion has not more than 3 carbon atoms.

11. A method according to claim 1 wherein $L^1$ in said formula (I) is linear partially fluorinated aliphatic hydrocarbon groups having 2 to 6 carbon atoms.

12. A method according to claim 1 wherein PF¹ in said formula (I) is selected from the group consisting of linear perfluorinated aliphatic groups having 1 to 6 carbon atoms; linear perfluorinated aliphatic groups interrupted with one or more oxygen atoms of which alkylene groups between oxygen atoms have not more than 6 carbon atoms and wherein the terminal alkyl group has not more than 6 carbon atoms; linear partially fluorinated aliphatic groups having 1 to 6 carbon atoms and not more than 2 hydrogen atoms and linear partially fluorinated aliphatic groups interrupted with one or more oxygen atoms and which have not more than 2 hydrogen atoms.

13. A method according to claim 1 wherein $L^1$ in said formula (I) is selected from the group consisting of —CFH—$(CF_2)_h$— wherein h is 0, 1, 2, 3, 4 or 5; —$CF_2$—CFH—$(CF_2)_d$— wherein d is 0, 1, 2, 3 or 4; —$CH_2$—$(CF_2)_h$— wherein h is 1, 2, 3 or 4; and —$(CH_2)_c$— wherein c is 1, 2, 3 or 4.

14. A method according to claim 1 wherein PF¹ or PF² corresponds to the following formula:

$$R_f^1\text{—}[OR_f^2]_p\text{—}[OR_f^3]_q\text{—}$$

wherein $R_f^1$ is a perfluorinated linear aliphatic group of 1 to 6 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1.

15. A method according to claim 1 wherein PF¹ corresponds to the following formula:

$$R_f^7\text{—}(O)_t\text{—CFH—CF}_2\text{—}$$

wherein t is 0 or 1 and $R_f^7$ represents a linear partially or fully fluorinated aliphatic group optionally interrupted with one or more oxygen atoms.

16. A method according to claim 1 wherein PF¹ corresponds to the formula:

$$R_f^8\text{—}(OCF_2)_a\text{—}$$

wherein a is an integer of 1 to 6 and $R_f^8$ is a linear partially fluorinated aliphatic group or a linear fully fluorinated aliphatic group having 1, 2, 3 or 4 carbon atoms.

17. A method according to claim 1 wherein PF² corresponds to the formula:

$$R_f^8\text{—}(OCF_2)_a\text{—}$$

wherein a is an integer of 1 to 6 and $R_f^8$ is a linear fully fluorinated aliphatic group having 1, 2, 3 or 4 carbon atoms.

18. A method according to claim 1 wherein PF¹ corresponds to the formula:

$$R_f^9\text{—O—}(CF_2)_b\text{—}$$

wherein b is an integer of 1 to 6, and $R_f^9$ is a linear partially fluorinated aliphatic group or a linear fully fluorinated aliphatic group having 1, 2, 3 or 4 carbon atoms.

19. A method according to claim 1 wherein PF² corresponds to the formula:

$$R_f^9\text{—O—}(CF_2)_b\text{—}$$

wherein b is an integer of 1 to 6, and $R_f^9$ is or a linear fully fluorinated aliphatic group having 1, 2, 3 or 4 carbon atoms.

20. A method according to claim 1 wherein the fluorinated carboxylic acid corresponds to the following formula:

$$[R_f^a\text{—}(O)_t\text{—CHF—}(CF_2)_n\text{—COO}^-]_i X^{i+}$$

wherein $R_f^a$ represents a linear partially or fully fluorinated aliphatic group optionally interrupted with one or more oxygen atoms, t is 0 or 1 and n is 0 or 1, $X^{i+}$ represents a cation having a valence i and i is 1, 2 or 3, with the proviso that when t is 0, the $R_f^a$ contains at least one ether oxygen atom.

21. A method according to claim 1 wherein the fluorinated carboxylic acid corresponds to the following formula:

$$R_f^b\text{—}(O)_t\text{—CFH-CF}_2\text{—O—R-G}$$

wherein $R_f^b$ represents a linear partially or fully fluorinated aliphatic group optionally interrupted with one or more oxygen atoms, R is an aliphatic hydrocarbon group, G represents a carboxylic acid or salt thereof, t is 0 or 1.

22. A method according to claim 1 wherein the fluorinated carboxylic acid corresponds to one of the following formulas:

$$R_f^c\text{—}(OCF_2)_u\text{—O—}(CF_2)_v\text{-AC}$$

wherein u is an integer of 1 to 6, v is an integer of 2 to 6, $R_f^c$ represents a linear perfluorinated aliphatic group of 1, 2, 3 or 4 carbon atoms and AC represents a carboxylic acid group or salt thereof; and $$R_f^c\text{—O—}(CF_2)_y\text{—O—}L^1\text{-AC} \qquad (IX)$$

wherein y has a value of 1, 2, 3, 4, 5 or 6, $L^1$ represents a linear perfluorinated alkylene of 2, 3, 4, 5 or 6 carbon atoms or a linear partially fluorinated alkylene having 1 to 6 carbon atoms and 1 or 2 hydrogen atoms, $R_f^c$ is as defined in above formula (VIII) and AC represents a carboxylic acid group or salt thereof.

23. A method according to claim 1 wherein the fluorinated carboxylic acid or salt thereof is selected from the group consisting of $C_3F_7$—O—CHF—COOH
$CF_3$—O—$CF_2CF_2$—$CF_2$—O—CHF—COOH
$CF_3CF_2CF_2$—O—$CF_2CF_2CF_2$—O—CHF—COOH
$CF_3$—O—$CF_2$—$CF_2$—O—CHF—COOH
$CF_3$—O—$CF_2$—O—$CF_2$—$CF_2$—O—CHF—COOH
$CF_3$—(O—$CF_2$)$_2$—O—$CF_2$—$CF_2$—O—CHF—COOH
$CF_3$—(O—$CF_2$)$_3$—O—$CF_2$—$CF_2$—O—CHF—COOH
$CF_3$—O—CHF—$CF_2$—COOH
$CF_3$—O—$CF_2$—$CF_2$—O—CHF—$CF_2$—COOH
$CF_3$—$CF_2$—O—CHF—$CF_2$—COOH
$CF_3$—O—$CF_2$—$CF_2$—$CF_2$—O—CHF—$CF_2$—COOH
$CF_3$—O—$CF_2$—O—$CF_2$—$CF_2$—O—CHF—$CF_2$—COOH
$CF_3$—(O—$CF_2$)$_2$—O—$CF_2$—$CF_2$—O—CHF—$CF_2$—COOH
$CF_3$—(O—$CF_2$)$_3$—O—$CF_2$—$CF_2$—O—CHF—$CF_2$—COOH
$CF_3$—O—$CF_2$—CHF—COOH
$C_3F_7$—O—$CF_2$—CHF—COOH
$CF_3$—O—$CF_2$—$CF_2$—$CF_2$—O—$CF_2$—CHF—COOH
$CF_3$—O—$CF_2$—O—$CF_2$—$CF_2$—O—$CF_2$—CHF—COOH
$CF_3$—(O—$CF_2$)$_2$—O—$CF_2$—$CF_2$—O—$CF_2$—CHF—COOH
$CF_3$—(O—$CF_2$)$_3$—O—$CF_2$—$CF_2$—O—$CF_2$—CHF—COOH
$CF_3$—O—$CF_2$—CHF—$CF_2$—COOH
$C_2F_5$—O—$CF_2$—CHF—$CF_2$—COOH
$C_3F_7$—O—$CF_2$—CHF—$CF_2$—COOH
$CF_3$—O—$CF_2$—$CF_2$—$CF_2$—O—$CF_2$—CHF—$CF_2$—COOH
$CF_3$—O—$CF_2$—O—$CF_2$—$CF_2$—O—$CF_2$—CHF—$CF_2$—COOH
$CF_3$—(O—$CF_2$)$_2$—O—$CF_2$—$CF_2$—O—$CF_2$—CHF—$CF_2$—COOH
$CF_3$—(O—$CF_2$)$_3$—O—$CF_2$—$CF_2$—O—$CF_2$—CHF—$CF_2$—COOH
$CF_3$—O—CHF—$CF_2$—O—$CH_2$—COOH
$CF_3$—O—$CF_2$—$CF_2$—$CF_2$—O—CHF—$CF_2$—O—$CH_2$—COOH
$C_3F_7$—O—CHF—$CF_2$—O—$CH_2$—COOH
$C_3F_7$—O—CHF—$CF_2$—O—$CH_2$—$CH_2$—COOH
$C_3F_7$—O—$CF_2$—$CF_2$—O—CHF—$CF_2$—$OCH_2COOH$
$C_3F_7$—O—$CF_2$—$CF_2$—$CF_2$—O—CHF—$CF_2$—$OCH_2COOH$
$C_3F_7$—O—$CF_2$—CHF—$CF_2$—$OCH_2COOH$
$CF_3$—CHF—$CF_2$—O—$CH_2COOH$
$C_3F_7$—$CF_2$—CHF—$CF_2$—$OCH_2$—COOH
$CF_3$—O—$CF_2$—$CF_2$—O—$CH_2$—COOH
$CF_3$—O—$CF_2$—$CF_2$—$CF_2$—O—$CF_2$—$CF_2$—O—$CH_2$—COOH
$C_3F_7$—O—$CF_2$—$CF_2$—O—$CH_2$—COOH
$C_3F_7$—O—$CF_2$—$CF_2$—O—$CH_2$—$CH_2$—COOH
$C_3F_7$—O—$CF_2$—$CF_2$—O—$CF_2$—$CF_2$—$OCH_2COOH$
$C_3F_7$—O—$CF_2$—$CF_2$—$CF_2$—O—$CF_2$—$CF_2$—$OCH_2COOH$
$C_3F_7$—O—$CF_2$—$CF_2$—$CF_2$—$OCH_2COOH$
$C_4F_9$—O—$CH_2COOH$
$C_4F_9$—O—$CH_2$—$CH_2$—COOH
$C_3F_7$—O—$CH_2COOH$
$C_6F_{13}$—$OCH_2$—COOH
$CF_3$—O—$CF_2$—$CF_2$—COOH
$C_2F_5$—O—$CF_2$—$CF_2$—COOH
$C_3F_7$—O—$CF_2$—$CF_2$—COOH
$C_4F_9$—O—$CF_2$—$CF_2$—COOH
$CF_3CFH$—O—$(CF_2)_3$—COOH
$CF_3CFH$—O—$(CF_2)_5$—COOH
$CF_3$—$CF_2$—O—$(CF_2)_3COOH$
$CF_3$—$CF_2$—O—$(CF_2)_5COOH$ and salts of any of these fluorinated carboxylic acids.

* * * * *

UNITED STATES PATENT AND TRADEMARK OFFICE
CERTIFICATE OF CORRECTION

PATENT NO. : 7,795,332 B2
APPLICATION NO. : 11/420416
DATED : September 14, 2010
INVENTOR(S) : Klaus Hintzer et al.

It is certified that error appears in the above-identified patent and that said Letters Patent is hereby corrected as shown below:

Title Page, Column 2 (Other Publications)
Line 3, delete "[1999 ]." and insert in place thereof -- [1999]. --.

Column 2
Line 38, delete "$X^{i-}$" and insert in place thereof -- $X^{i+}$ --.

Column 8
Line 35 (approx.), delete "thereof, and" and insert in place thereof
-- thereof; and --.

Line 42 (approx.), delete "thereof A" and insert in place thereof -- thereof. A --.

Column 13
Line 60-61, delete "TRITON™0" and insert in place thereof -- TRITON™ --.

Column 19
Line 48, delete "$(CF_2)_3$ $COONH_4$" and insert in place thereof -- $(CF_2)_3COONH_4$ --.

Column 22
Line 62 (approx.), in Claim 1, delete "$L^{l}$" and insert in place thereof -- $L^1$ --.

Column 23
Line 40, in Claim 11, delete "$L^{l}$" and insert in place thereof -- $L^1$ --.

Line 55, in Claim 13, delete "$L^{l}$" and insert in place thereof -- $L^1$ --.

Line 65, in Claim 14, delete "$R_f^{l}$" and insert in place thereof -- $R_f^{1}$ --.

Signed and Sealed this
Fourteenth Day of June, 2011

David J. Kappos
*Director of the United States Patent and Trademark Office*

CERTIFICATE OF CORRECTION (continued)
U.S. Pat. No. 7,795,332 B2

Column 24
Line 51 (approx.), in Claim 21, delete "$R_f^b-(O)_t-CFH-CF_2-O-R-G$" and insert in place thereof
-- $R_f^b-(O)_t-CFH-CF_2-O-R-G$ --.

Line 66, in Claim 22, delete "$L^1$" and insert in place thereof -- $L^1$ --.

Column 25
Line 10, in Claim 23, delete, "$-O-CF_2CF_2CF_2-$" and insert in place thereof
-- $-O-CF_2CF_2-CF_2-$ --.

Line 34, in Claim 23, delete "$CF_{2-COOH}$" and insert in place thereof
-- $CF_2-COOH$ --.

Column 26
Line 25 (approx.), in Claim 23, delete "$CH_2COOH$" and insert in place thereof
-- $CF_2-COOH$ --.